US007522789B2

(12) United States Patent
Dames et al.

(10) Patent No.: US 7,522,789 B2
(45) Date of Patent: Apr. 21, 2009

(54) OPTICAL SWITCHES AND ACTUATORS

(75) Inventors: Andrew Nicholas Dames, Cambridge (GB); Martin Edward Brock, Cambridge (GB)

(73) Assignee: Polatis Ltd., Cambridge (GB)

( * ) Notice: Subject to any disclaimer, the term of this patent is extended or adjusted under 35 U.S.C. 154(b) by 0 days.

(21) Appl. No.: 11/569,496

(22) PCT Filed: May 31, 2005

(86) PCT No.: PCT/GB2005/002150

§ 371 (c)(1),
(2), (4) Date: Nov. 21, 2006

(87) PCT Pub. No.: WO2005/119313

PCT Pub. Date: Dec. 15, 2005

(65) Prior Publication Data

US 2007/0230865 A1    Oct. 4, 2007

(30) Foreign Application Priority Data

| May 29, 2004 | (GB) | ................................. 0412157.0 |
| Jul. 16, 2004 | (GB) | ................................. 0415876.2 |
| Oct. 11, 2004 | (GB) | ................................. 0422536.3 |
| Jan. 21, 2005 | (GB) | ................................. 0501301.6 |
| Apr. 15, 2005 | (GB) | ................................. 0507636.9 |

(51) Int. Cl.
*G02B 6/26* (2006.01)
*G02B 6/42* (2006.01)
*G02B 26/08* (2006.01)

(52) U.S. Cl. ............................. 385/18; 385/15; 385/16; 385/17; 385/19; 385/22; 385/31; 385/33; 385/36; 385/39; 385/48; 359/196; 359/197; 359/198; 359/212; 359/214; 359/223; 359/224; 359/225

(58) Field of Classification Search .................. 385/18; 359/198, 212, 214, 223, 224, 225
See application file for complete search history.

(56) References Cited

U.S. PATENT DOCUMENTS

| 6,204,946 | B1   | 3/2001  | Aksyuk et al. |
| 6,366,414 | B1 * | 4/2002  | Aksyuk et al. ............... 359/822 |
| 6,501,877 | B1 * | 12/2002 | Weverka et al. ............... 385/31 |
| 6,504,976 | B1   | 1/2003  | Polynkin et al. |
| 6,507,685 | B1   | 1/2003  | Polynkin et al. |
| 6,532,093 | B2 * | 3/2003  | Sun et al. ..................... 359/198 |
| 6,535,311 | B1   | 3/2003  | Lindquist |
| 6,549,699 | B2   | 4/2003  | Belser et al. |
| 6,556,739 | B1 * | 4/2003  | Kruglick ....................... 385/17 |

(Continued)

FOREIGN PATENT DOCUMENTS

WO        WO 01/50176 A1    7/2001

(Continued)

*Primary Examiner*—Frank G Font
*Assistant Examiner*—Ryan Lepisto
(74) *Attorney, Agent, or Firm*—Workman Nydegger

(57) ABSTRACT

An optical switch comprises one or more input ports for directing an optical beam into the switch; dispersive means configured to receive said optical beam and which spatially separate the optical beam into individual wavelength components which are routed to an actuator; wherein the actuator is in the form of an array of elongate movable fingers for selectively interfering with individual wavelength components and means are provided to direct optical beams to selected one or more output ports.

22 Claims, 25 Drawing Sheets

U.S. PATENT DOCUMENTS

| | | | |
|---|---|---|---|
| 6,587,612 B1 * | 7/2003 | Mitchell et al. | 385/18 |
| 6,625,346 B2 | 9/2003 | Wilde | |
| 6,628,452 B2 * | 9/2003 | Haeberle et al. | 359/298 |
| 6,647,164 B1 * | 11/2003 | Weaver et al. | 385/16 |
| 6,661,948 B2 | 12/2003 | Wilde | |
| 6,661,953 B2 * | 12/2003 | Cao | 385/37 |
| 6,687,431 B2 | 2/2004 | Chen et al. | |
| 6,695,457 B2 | 2/2004 | van Drieenhuizen et al. | |
| 6,707,959 B2 | 3/2004 | Ducellier et al. | |
| 6,711,316 B2 | 3/2004 | Ducellier | |
| 6,771,850 B1 * | 8/2004 | Greywall | 385/17 |
| 6,868,205 B2 * | 3/2005 | Weverka et al. | 385/31 |
| 6,956,683 B2 * | 10/2005 | Heaton et al. | 359/198 |
| 6,975,789 B2 * | 12/2005 | Weverka et al. | 385/18 |
| 2002/0067533 A1 * | 6/2002 | Sun et al. | 359/198 |
| 2002/0131698 A1 | 9/2002 | Wilde | |
| 2003/0011862 A1 * | 1/2003 | Graefenhain | 359/223 |
| 2003/0108284 A1 | 6/2003 | Danagher et al. | |
| 2003/0133095 A1 | 7/2003 | Solgaard et al. | |
| 2003/0173865 A1 * | 9/2003 | Miller et al. | 310/309 |
| 2003/0223678 A1 * | 12/2003 | Hunter | 385/18 |
| 2004/0062510 A1 | 4/2004 | Romo et al. | |
| 2004/0114259 A1 * | 6/2004 | Ishizuya et al. | 359/849 |
| 2004/0130764 A1 * | 7/2004 | Stenger et al. | 359/223 |
| 2004/0264846 A1 * | 12/2004 | Nakata et al. | 385/18 |

FOREIGN PATENT DOCUMENTS

| | | |
|---|---|---|
| WO | WO 02/46825 A1 | 6/2002 |
| WO | WO 02/103816 A2 | 12/2002 |
| WO | WO 03/104872 A1 | 12/2003 |

* cited by examiner

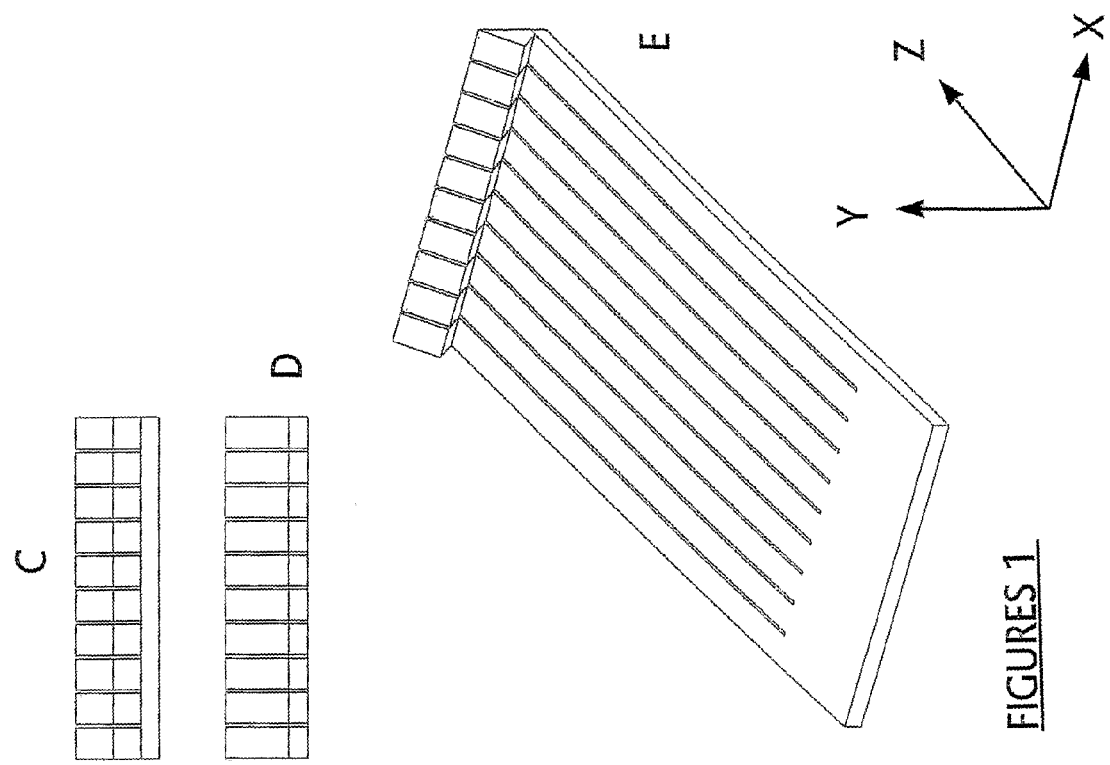
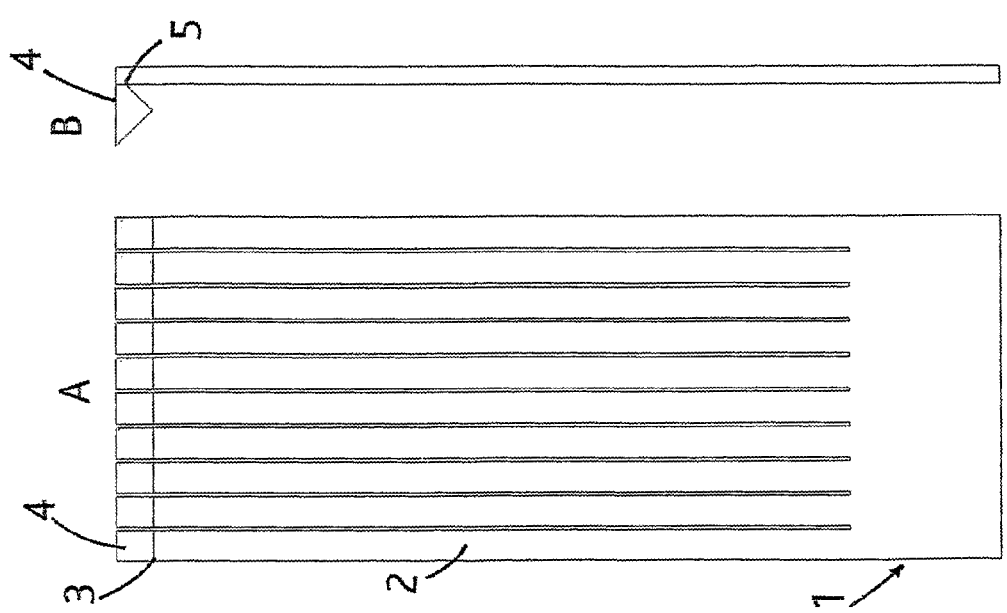
FIGURES 1

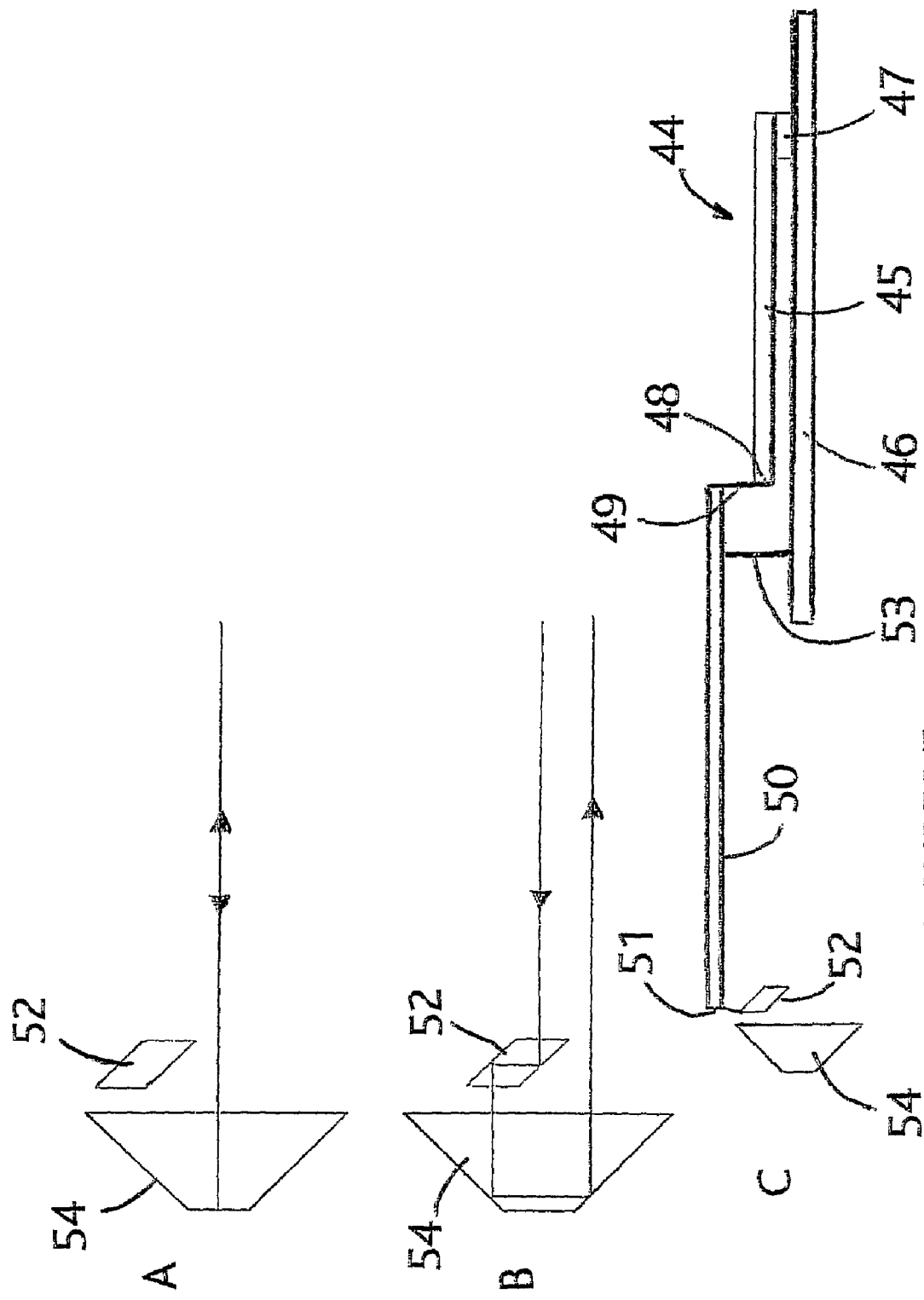

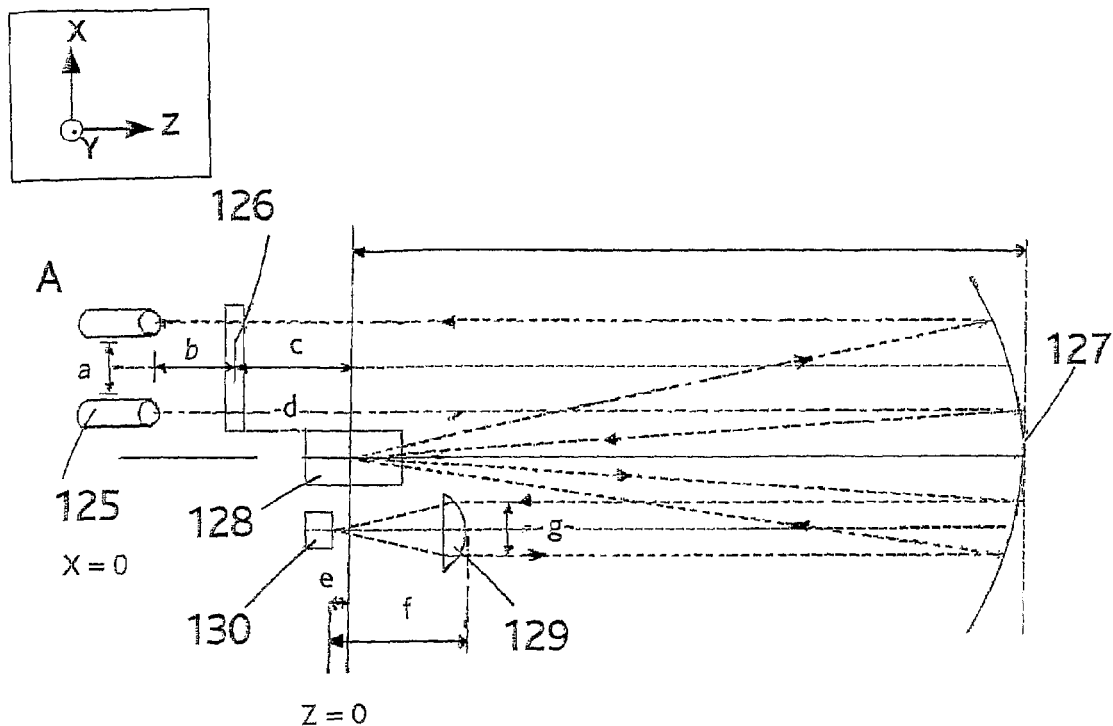
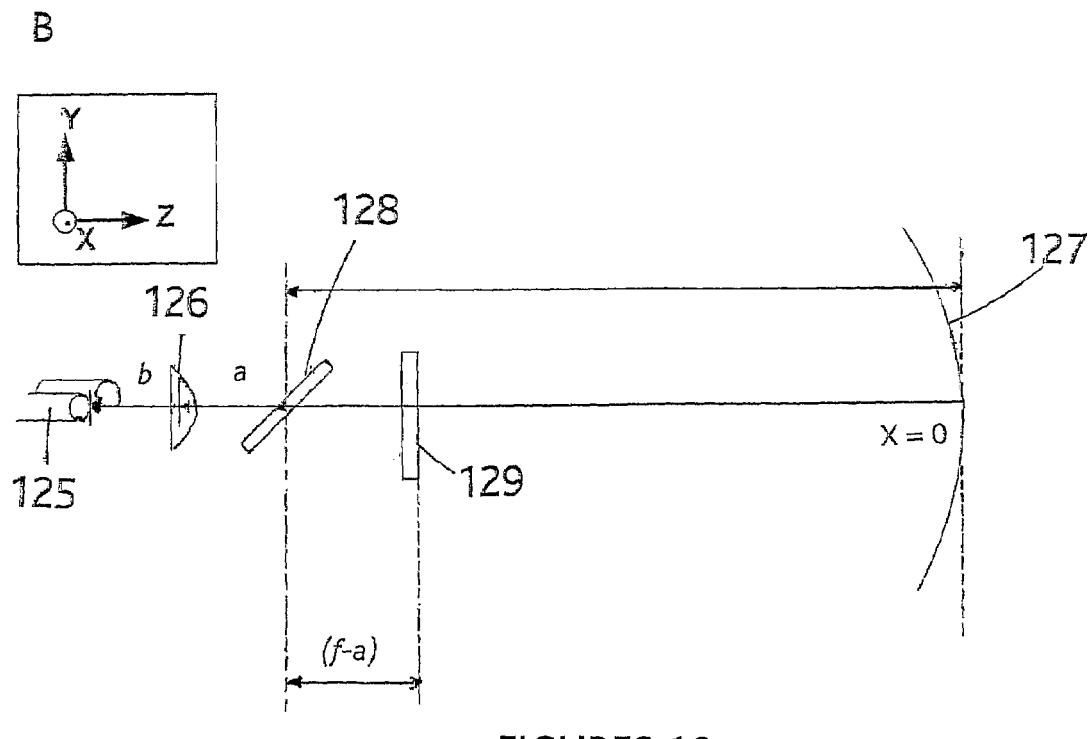
FIGURES 16

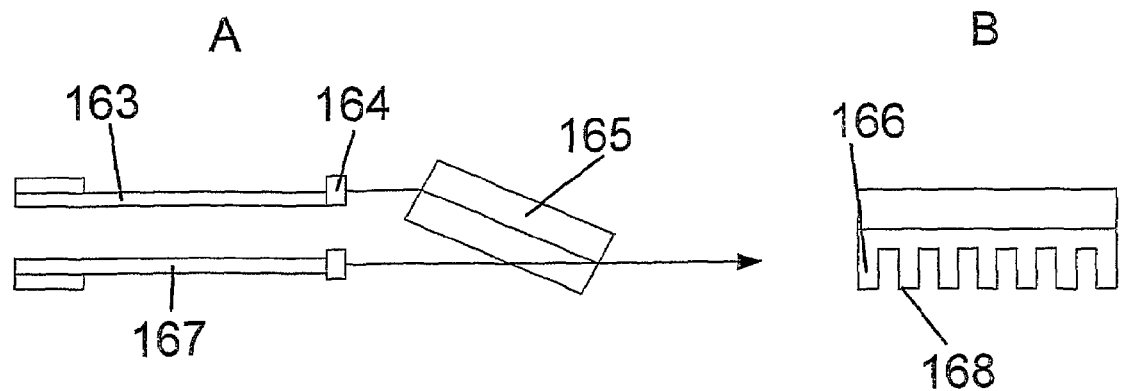
FIGURES 22
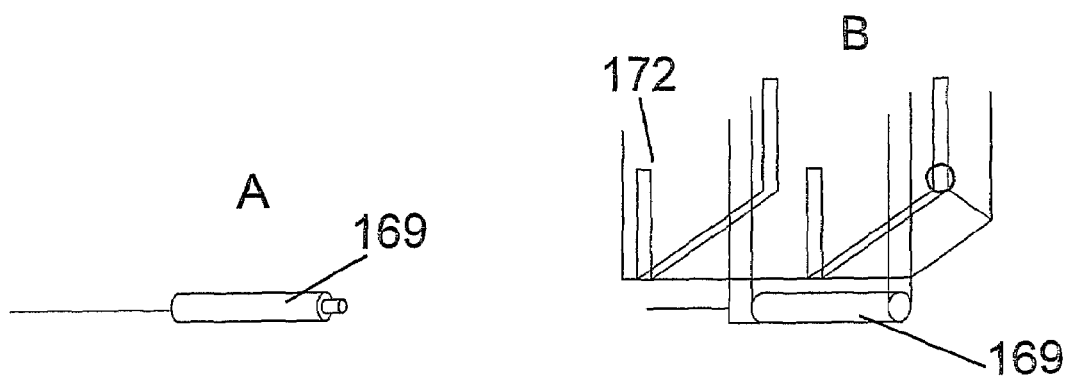
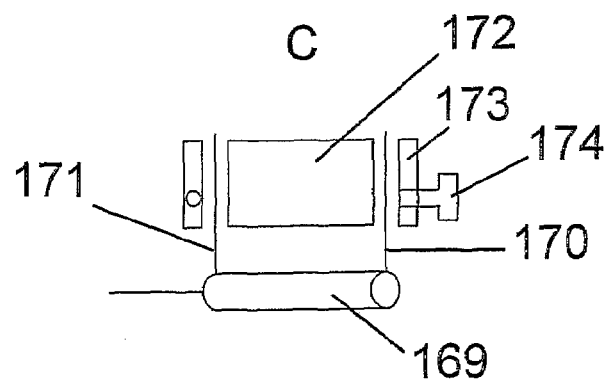
FIGURES 23

OPTICAL SWITCHES AND ACTUATORS

FIELD OF THE INVENTION

The invention relates to optical switches and actuators. The invention relates particularly to optical wavelength selective switches.

BACKGROUND TO THE INVENTION AND PRIOR ART KNOWN TO THE APPLICANT(S)

The applicant's own previously published patent document such as WO01/50176, WO02/46825, WO02/103816 and WO03/104872 constitute a useful source of prior art document. These show, for example, piezoelectric actuator fingers used for driving the displacement of collimators in direct collimator to collimator optical switching. WO02/103816 in particular shows detailed configurations of piezoelectric actuators of a monolithic type. WO03/104872 shows in detail how flexure arrangements may be used to amplify the deflection of an optical element such as a collimator.

Other prior art documents show devices for spreading light from a fibre into different frequency components via a diffraction grating which rely on the modulation of the intensity of each component using either liquid crystal display (LCD) arrays or linear arrays of tilting mirror elements which directly re-image the spectrum from the diffraction grating into another fibre. U.S. Pat. No. 6,661,948 (Capella Photonics Incorporated) uses a diffraction grating and an array of micro-mirrors which are individually and continuously controllable. Such systems rely on so-called micro-electro-mechanical (MEMs) systems. Other similar publications exist such as: U.S. Pat. Nos. 6,695,457, 6,687,431, 6,625,346, 6,549,699, 6,507,685, 6,504,976 and US2002/0131698. Similarly, U.S. Pat. No. 6,535,311 (Corning Incorporated) also relies on the use of MEMs systems which in this publication takes the form of a shutter array. Furthermore, U.S. Pat. No. 6,711,316 (JDS Uniphase Incorporated) also relies on the use of deflector arrays, either liquid crystal, phase arrays or reflective MEMS arrays. This is also the case for patent document U.S. Pat. No. 6,707,959 (JDS Uniphase Incorporated) which relies on the use of MEMS. U.S. Pat. No. 6,204,946 (Lucent Technologies Incorporated) also requires the use of MEMs for receiving multiple-wavelength signals and selectively switching between a transmission mode and a reflection mode.

Another piece of prior art is disclosed in U.S. Pat. No. 6,661,953 (Avanex Corporation). This document shows an apparatus with at least one input fibre; a lens optically coupled to at least one input fibre; a diffraction grating selectively coupled to the lens at a side opposite to at least one input fibre; at least one output fibre optically coupled to the lens at the side opposite to the diffraction grating and a plurality of moveable rods residing at the side of the lens opposite to the diffraction grating, wherein the plurality of moveable rods is capable of intercepting a variable portion of a light traversing through the lens. Whilst this document mentions that their moveable rod array may be fabricated as a micro-electro-mechanical system, it may also be fabricated as a set of bendable piezoelectric rods. The system shown however envisages only inputs/outputs from optical fibres; shows the use of a simple piezoelectric comb without any reflective elements and is concerned primarily with optical detection or attenuation of wavelength channels.

SUMMARY OF THE INVENTION

In a first broad independent aspect, the invention provides an optical switch comprising one or more input ports for directing an optical beam into the switch; dispersive means configured to receive said optical beam and which spatially separate the optical beam into individual wavelength components which are routed to an actuator; wherein the actuator is in the form of an array of elongate movable fingers for selectively interfering with individual wavelength components and means are provided to direct optical beams to selected one or more output ports.

This arrangement is particularly advantageous because it allows optical switches to be configured of bulk optical components such as lenses, collimators, prisms and bulk mirrors to achieve comparable levels of accuracy to switches necessarily incorporating MEMs elements. This also reduces the required level of tolerances; simplifies the manufacturing and servicing requirements which have considerable cost benefits.

In a first subsidiary aspect in accordance with the invention's first broad aspect, one or more fingers are piezoelectric benders which do not carry an optical element but are displaceable into individual wavelength components to block selected wavelengths.

In a further subsidiary aspect, the fingers are part of a comb array.

In a further subsidiary aspect, one or more fingers displace an optical element.

In a further subsidiary aspect, the or each optical element is a reflective element which is displaceable in order to interfere with selected wavelength components.

In a further subsidiary aspect, the or each optical element is a prism. One of the advantages of using a prism for such an arrangement is that it allows the light to be displaced whilst any tilt, twist or small displacement up/down or in/out has no first order effect on the shifted beam.

In a further subsidiary aspect, the or each prism is truncated to form a surface for engaging the free moving extremity of the or each finger. This allows the prism to be securely retained on the finger.

In a further subsidiary aspect, the or each reflective element is attached to the finger by a flexure means. This would allow a flexible attachment to be achieved which may be used to achieve repeatable amplification of any deflection at the extremity of the finger.

In another subsidiary aspect, the reflective element is a mirror. The use of a mirror rather than a micro-machined array of mirrors also has the advantages of minimal demand on the actuation structure which allows the system to operate with a high level of accuracy even without these components.

In a further subsidiary aspect, the or each mirror extends substantially perpendicularly from the longitudinal axis of the fingers.

In a further subsidiary aspect, the or each mirror is mounted along the axis of the corresponding finger.

In a further subsidiary aspect, the fingers form part of a comb; the fingers displace in one dimension; a first set of fingers of said comb carry optical elements; and a second set of fingers of said comb are linked to fingers of the first set by one or more linkage arms; whereby the first set of fingers drive the displacement of selected optical elements in a first dimension and the second set of fingers drive the displacement in a second dimension of selected optical element carrying fingers. One of the advantages of this configuration is that it allows an array of one dimensional actuators to achieve the two dimensional movements of optical elements.

In a further subsidiary aspect, the fingers are monolithic piezoelectric actuators displaceable in two dimensions, with a first connecting means to an optical element and a second connecting means between the optical element and a support structure; whereby the first connecting means and the second connecting means are spaced to achieve amplified movement of the optical element.

In a further subsidiary aspect, the fingers displace an optical element with a rod extending from the element into a housing equipped with means for sensing the position of the rod within said housing. This allows position feedback to be obtained for adjustments to take place in order to achieve high/adjustable levels of accuracy.

In a further subsidiary aspect, the switch comprises a first array of actuator fingers without optical elements and a second array of actuator fingers with optical elements for directing wavelength components. This configuration allows multi-channel switching as well as a blocking function.

In a further subsidiary aspect, the fingers incorporate a mirror located in front of the free moveable extremity of the fingers.

In a further subsidiary aspect, electrical sensing means are provided to sense the position of the fingers. This allows more accurate positioning of the optical elements.

In a further subsidiary aspect, electrical sensing means are provided to sense the position of the connecting means. This alternate location for electrical sensing also contributes to the overall accuracy of the electrical sensing means.

In a second broad independent aspect, the invention provides an actuator comb comprising a number of individually moveable elongate fingers carrying a reflective element at their moveable extremities.

In a subsidiary aspect in accordance with the invention's second broadest aspect, the reflective element is a prism.

In a further subsidiary aspect, the reflective element is a mirror.

In a third broad independent aspect, the invention provides an actuator comb comprising a number of individually moveable elongate fingers wherein a first set of fingers displace in one dimension and carry optical elements; a second set of fingers displace in one dimension without necessarily carrying an optical element and fingers of the first set are linked to fingers of the second set by one or more linkage arms; whereby the first set of fingers drive the displacement of the optical elements in a first dimension and the second set of fingers drive the displacement of the optical elements in a second dimension.

In a fourth broad independent aspect, the invention provides an actuator comprising a first comb of individually moveable elongate fingers and a second comb of individually moveable fingers, wherein the or each finger comprises a reflective element and the combs are located one relative to the other so that the light is successively reflected between corresponding reflective elements of the combs.

In a fifth broad independent aspect, the invention provides an optical arrangement comprising a number of inputs for inputting optical beams located one relative to the other at a first pitch and a slotted array of optical elements for receiving light from the inputs and directing the received beams so that the output beams are of a second pitch inferior to the first pitch.

In a subsidiary aspect in accordance with the invention's fifth aspect, the second pitch is half the first pitch.

In a further subsidiary aspect, the second pitch is approximately 1 mm and the first pitch is approximately 2 mm.

In a further subsidiary aspect, the slotted array of optical elements is a slotted mirror.

In a further subsidiary aspect, the slotted array of optical elements is a slotted prism.

In a further subsidiary aspect, the slotted array of optical elements is a slotted glass block.

BRIEF DESCRIPTION OF THE FIGURES

FIGS. 1a, b, c, d and e show an actuator comb with a truncated prism on each finger of the comb in plan, side elevation, front elevation, rear elevation and perspective view respectively.

FIG. 5b shows a side view of the actuator of FIG. 5a.

FIGS. 7a, b and c show schematically side views of a switch element using a prism.

FIG. 8b shows a side view of the embodiment of FIG. 8a.

FIG. 9b shows a side view of the embodiment of FIG. 9a.

FIG. 14a shows a schematic cross-sectional view of a finger for displacing a mirror block.

FIG. 14b shows a possible circuit for sensing the position of the various elements of the embodiment of FIG. 14a.

FIGS. 16a and 16b respectively show a plan view and a side view of a frequency selective switch using a tilting mirror in accordance with a further embodiment of the invention.

FIGS. 22a and b show an array of optical inputs associated with a slotted glass block in side/cross-sectional view and front view respectively.

FIGS. 23a, b and c show an array of a collimator and mounting block in perspective view (b) and side/cross-sectional view (c).

DETAILED DESCRIPTION OF THE FIGURES

Figure 2:
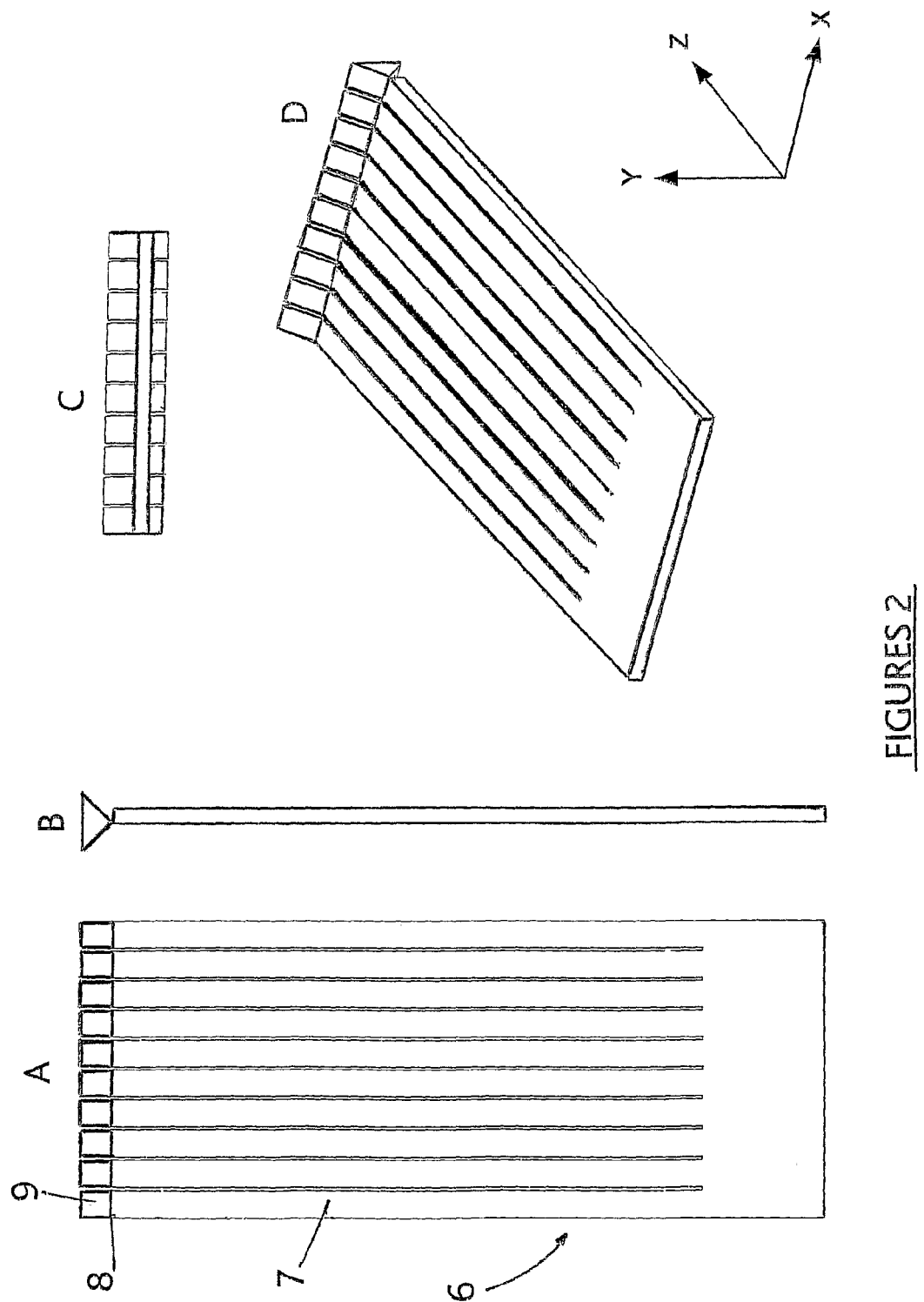
FIGS. 2a, b, c and d show an actuator comb where each finger carries a prism in plan, side elevation, front elevation and perspective view respectively.

FIGS. 1a, b, c, d and e show different views of a piezoelectric actuator comb 1 with ten separately moveable fingers 2. Each finger such as that referenced 2 may be displaced at their extremity 3 in essentially the Y direction (see orthogonal coordinate system in FIG. 1e). If this actuator is mounted in a horizontal plane in use, the individual fingers 2 will move in the upward and/or downward directions. The displacement of the free end of the piezo-finger aims at primarily achieving the tilting of the prism 4. In this sense, the displacement is a side effect with the tilting being the primary object. In order to obtain adequate ratio of rotation to displacement, the piezo-fingers act as if they are an arm rotating about an X axis at the centre of the free length of the piezo-fingers. The embodiments of FIGS. 2-5 below also cause this mode of tilting. By contrast, the embodiments of FIGS. 6 and 7, use the displacement of the piezo-fingers to generate amplified angle via their flexure arrangements.

Each finger of comb 1 carries a prism such as that referenced 4 at extremity 3. The prism may be attached to this extremity by any appropriate means known to the person skilled in the art. In this embodiment, the prism 4, as can be best seen in the view of FIG. 1b, is chopped at its lower extremity 5. The prism otherwise is of essentially triangular shape in cross-section. The line of truncation at extremity 5 extends perpendicular to the hypotenuse of the triangular shape of the prism.

As mentioned above, each finger is displaceable in simply one dimension in the illustrated embodiment. However, it is also envisaged that the fingers, which in this embodiment displace in one dimension only, may be made to displace in two or three dimensions. A two dimensionally displaceable finger may be obtained by employing an actuator of the kind described in WO02/103816, which is one of the applicant's prior publications. This publication is included by reference.

FIGS. 2a, b, c and d show various views of an actuator generally referenced 6 in the form of a piezoelectric comb actuator. The comb has a number of fingers such as that referenced 7, each carrying at its extremity 8 a prism 9. The piezoelectric comb may operate in a similar fashion to the piezoelectric comb actuator described with regard to FIG. 1. It is a particular object of this embodiment to achieve the displacement in one dimension in the Y direction of each individual finger. Since the extremity 8 of each finger is joined to the right angle of a prism 9, any displacement of extremity 8 will cause the displacement of the prism. In both the embodiments of FIGS. 1 and 2, the prism may either be only attached to a piezoelectric comb finger or in addition attached to a separate support structure via a flexure or any other appropriate joining means.

Figure 3:
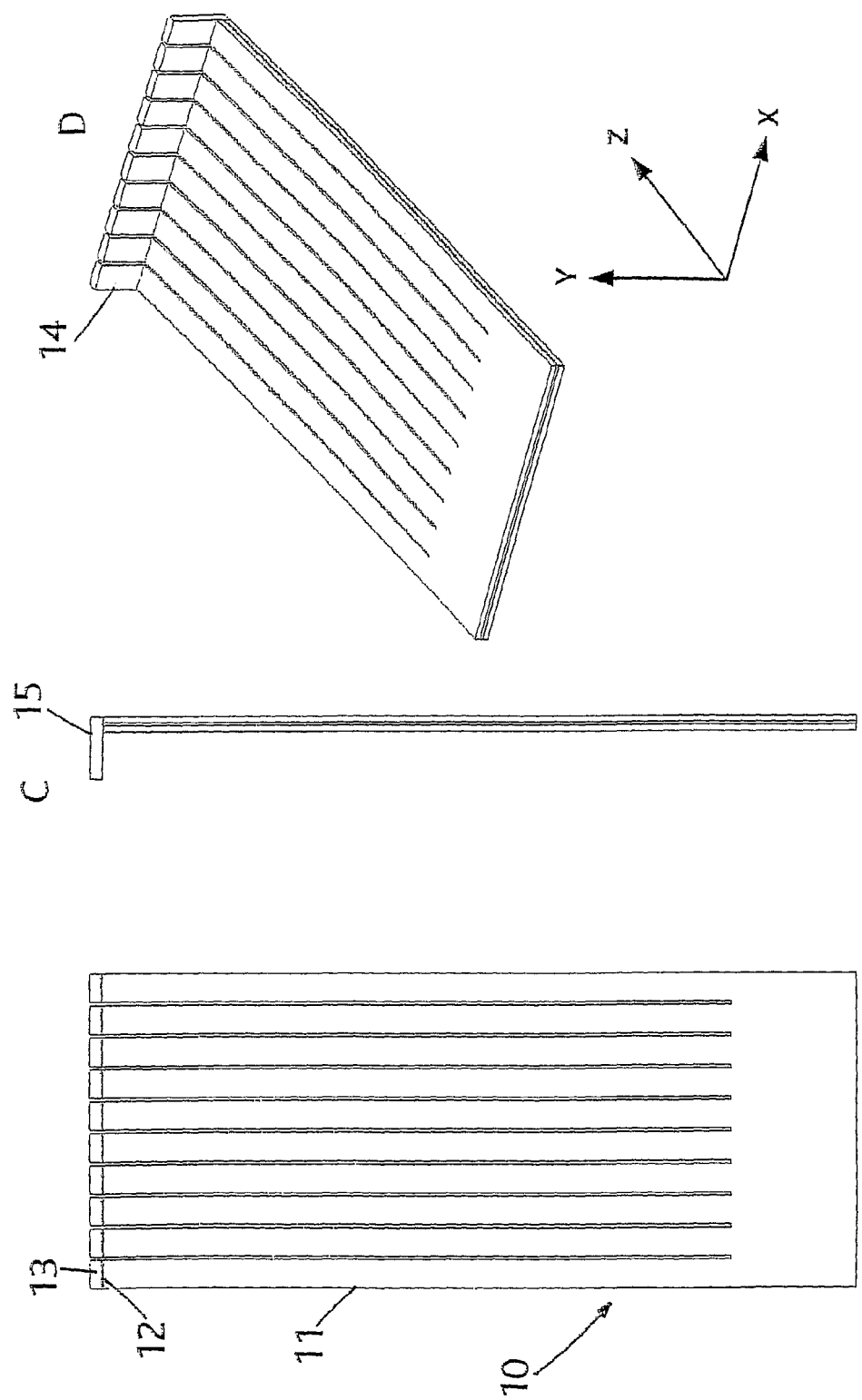
FIGS. 3a, b, c and d shows an actuator comb with each finger carrying a perpendicularly placed mirror in plan, front elevation, side elevation and perspective view respectively.

FIG. 3 show various views a, b, c and d of an actuator generally referenced 10. Actuator 10 takes the form of a piezoelectric comb actuator with a number of fingers 11 which, at extremity 12, are attached to a reflective element or mirror 13. The mirror, as shown in the figures, extends perpendicular from its corresponding finger. Mirror 13 may be reflective on any face of the mirror, it is however envisaged that the reflective face is either face 14 or face 15. The choice of reflective element and its position relative to its corresponding finger will depend on the application envisaged for this actuator.

In this embodiment, the fingers are designed to displace in both the X and Y directions. The two lines along the piezo-actuator finger define area of the finger which carries out displacement in the X direction whereas the areas above and below these lines are responsible for the displacements in Y directions. The fingers may alternatively be one dimensional actuator as in the embodiments of FIGS. 1 and 2 above. The actuators may also be entirely separate monolithic structures for displacing each mirror which when supported on a common support structure form a comb.

Figure 4:
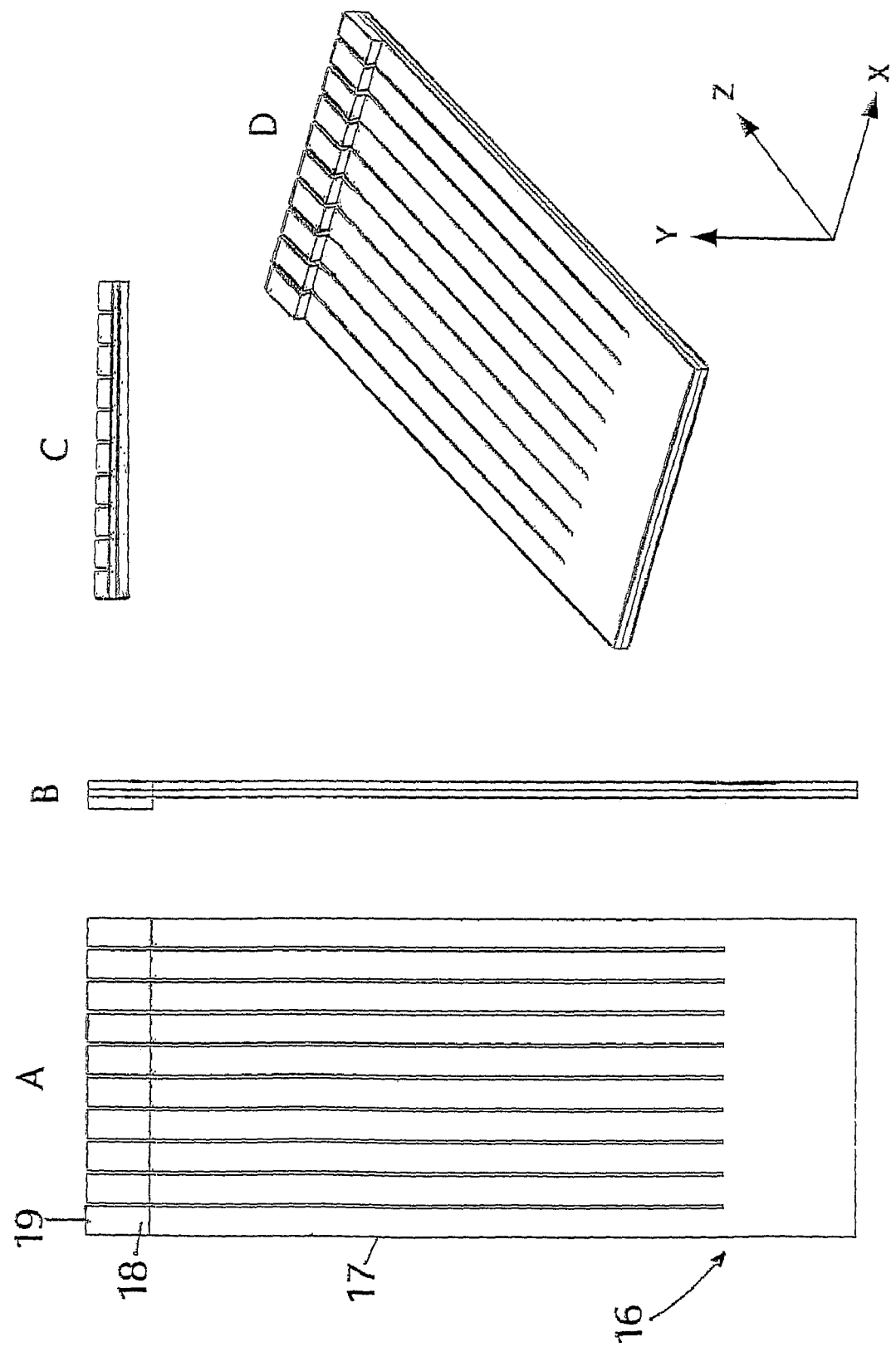
FIGS. 4a, b, c and d show an actuator in plan, side elevation, front elevation and perspective view respectively.

FIG. 4 show a variety of views of a further actuator 16 incorporating a number of fingers 17 onto which is fixed, at its extremity 18, a reflective element 19, which is in this embodiment, a mirror. Actuator 16 may operate and be configured in a similar fashion to the actuators of FIGS. 1, 2 and 3. Whilst the embodiment shown will achieve one dimensional displacement of extremity 18 of finger 17 in the Y direction, other configurations of fingers or separate actuators may achieve two or three dimensional displacement of the mirror 19.

Figure 5A:
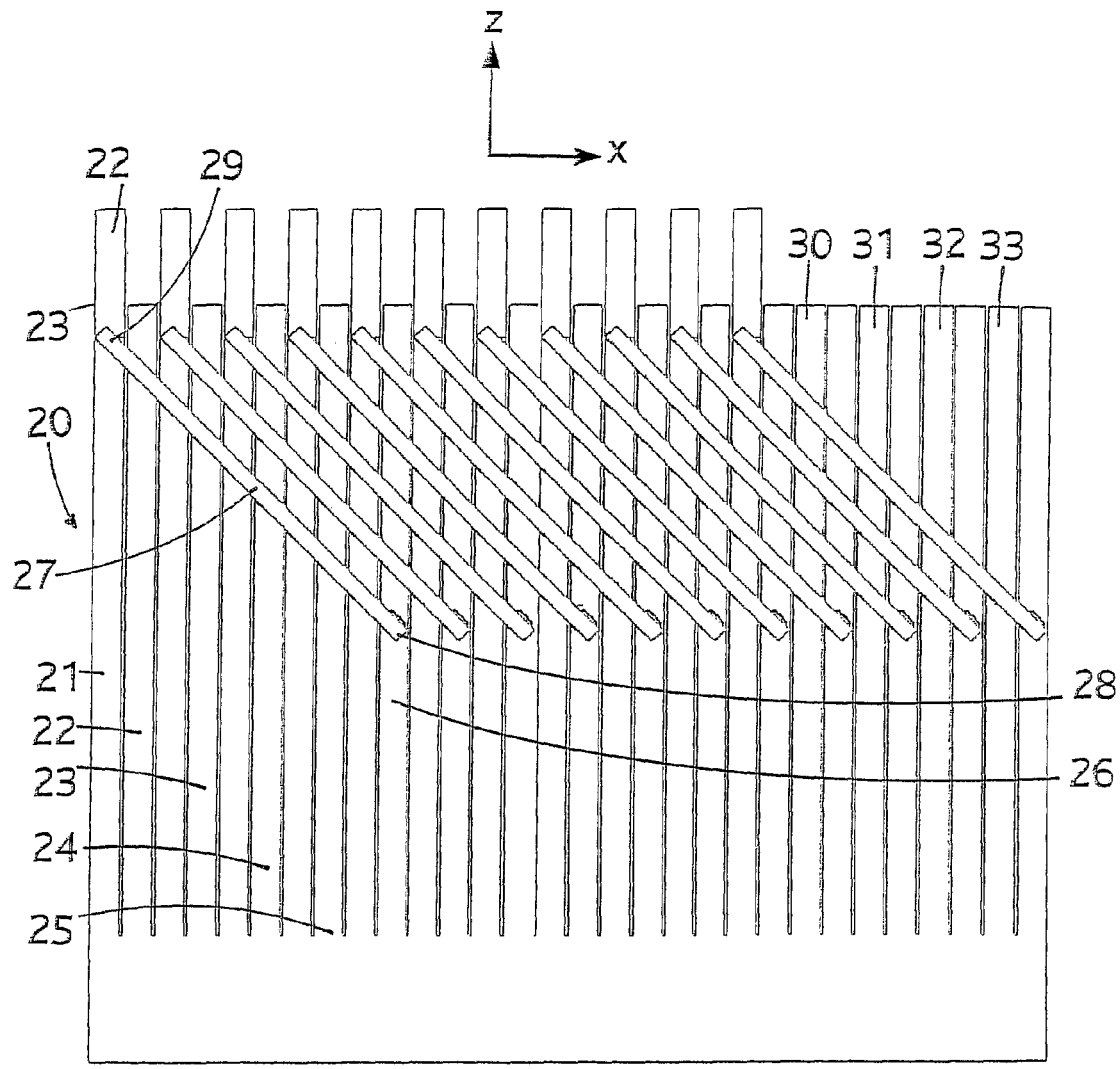
FIG. 5a shows a plan view of an actuator comb with linkage arms where the fingers are individually displaceable in one dimension to achieve the 2 dimensional displacement of an optical element.
Figure 5B:
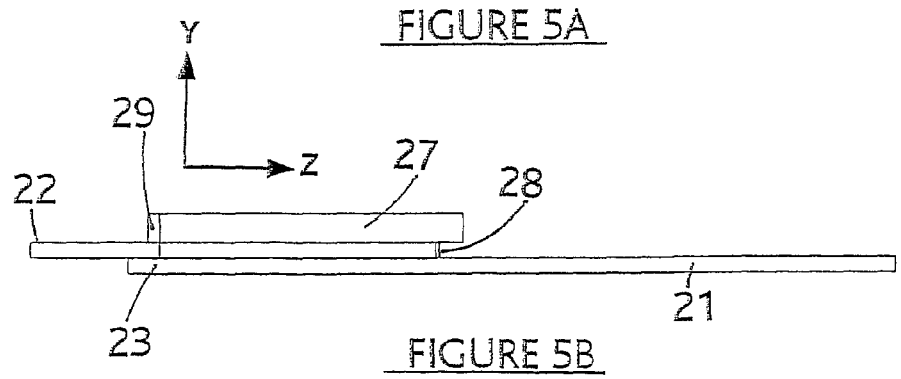

The following two figures, FIGS. 5a and 5b, show respectively a plan view and a side view of an actuator 20. This actuator takes the form of a piezoelectric comb actuator with a number of fingers which are separately displaceable upon actuation. Finger 21 is of similar configuration to finger 17 of FIG. 4a. It supports a reflective element 22 at its extremity 23. Finger 21 is, in this embodiment, a one dimensionally displaceable beam in the Y direction so that the displacements of finger 21 in the Y direction results in the displacement of mirror 22 in the same direction. Fingers 21 are only provided on alternate fingers of the comb. In this configuration, beams 22, 23, 24 and 25 are redundant and may in fact be removed if practical to do so. Beams 26 and all the other alternate beams from left to right also do not carry a mirror but are arranged to displace a diagonal linkage arm 27 which extends from an essentially centrally located attachment point (relative to the length of finger 26) to attachment point 29 in close proximity to extremity 23 of finger 21. Diagonal linkage arm 27 causes mirror 22 to displace in the X direction when finger 26 is displaced in the Y direction. This embodiment achieves two dimensional displacements of optical elements through a one dimensional piezo-actuator comb. Fingers 30, 31, 32 and 33 also do not contribute to the operation of the optical elements and may therefore be removed if practical.

FIG. 5b has retained the same numerical references as used with reference to FIG. 5a for ease of understanding. In this figure, attachment point 28 takes the form of a flexible rod 28 of identical height as the optical element 22.

Figure 6A:
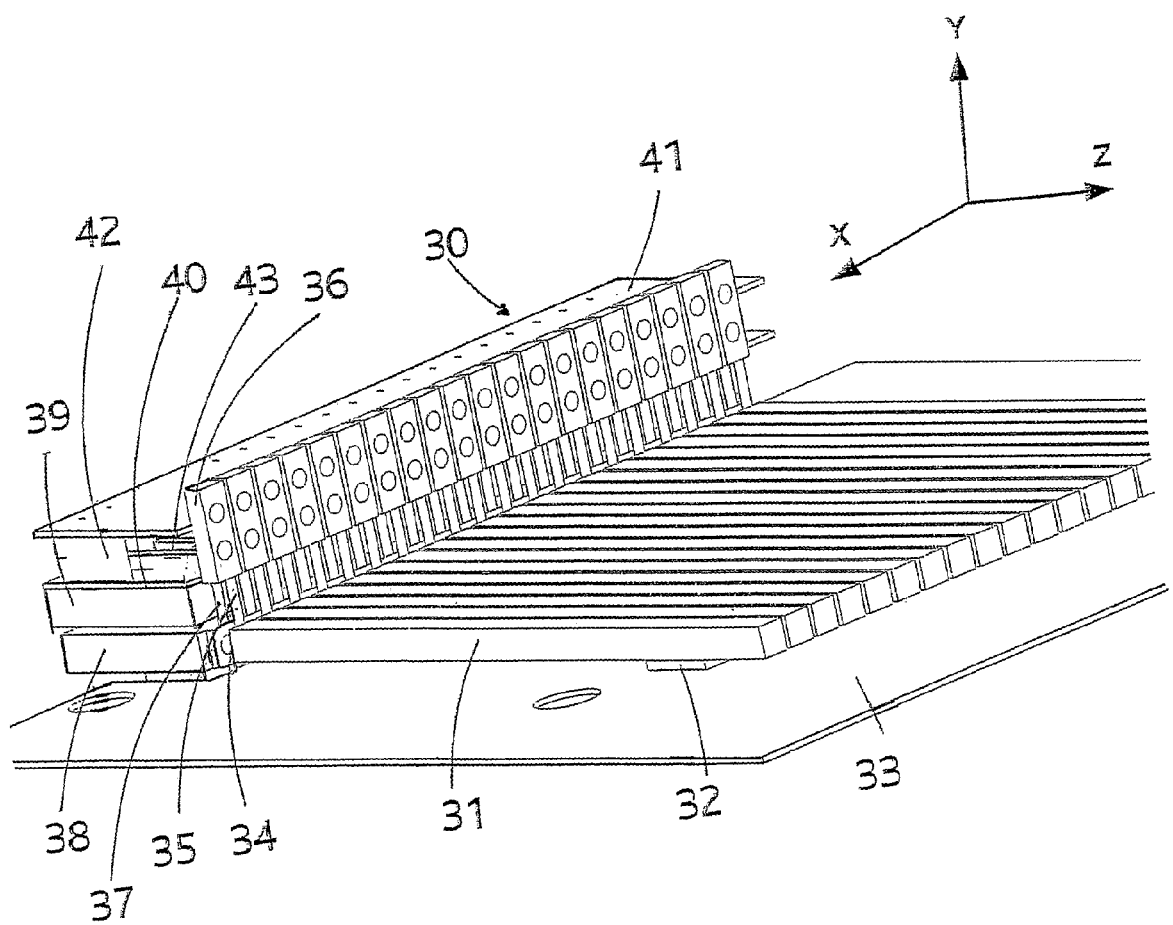
FIG. 6a shows a perspective view of an actuator with an array of mirrors.
Figure 6B:
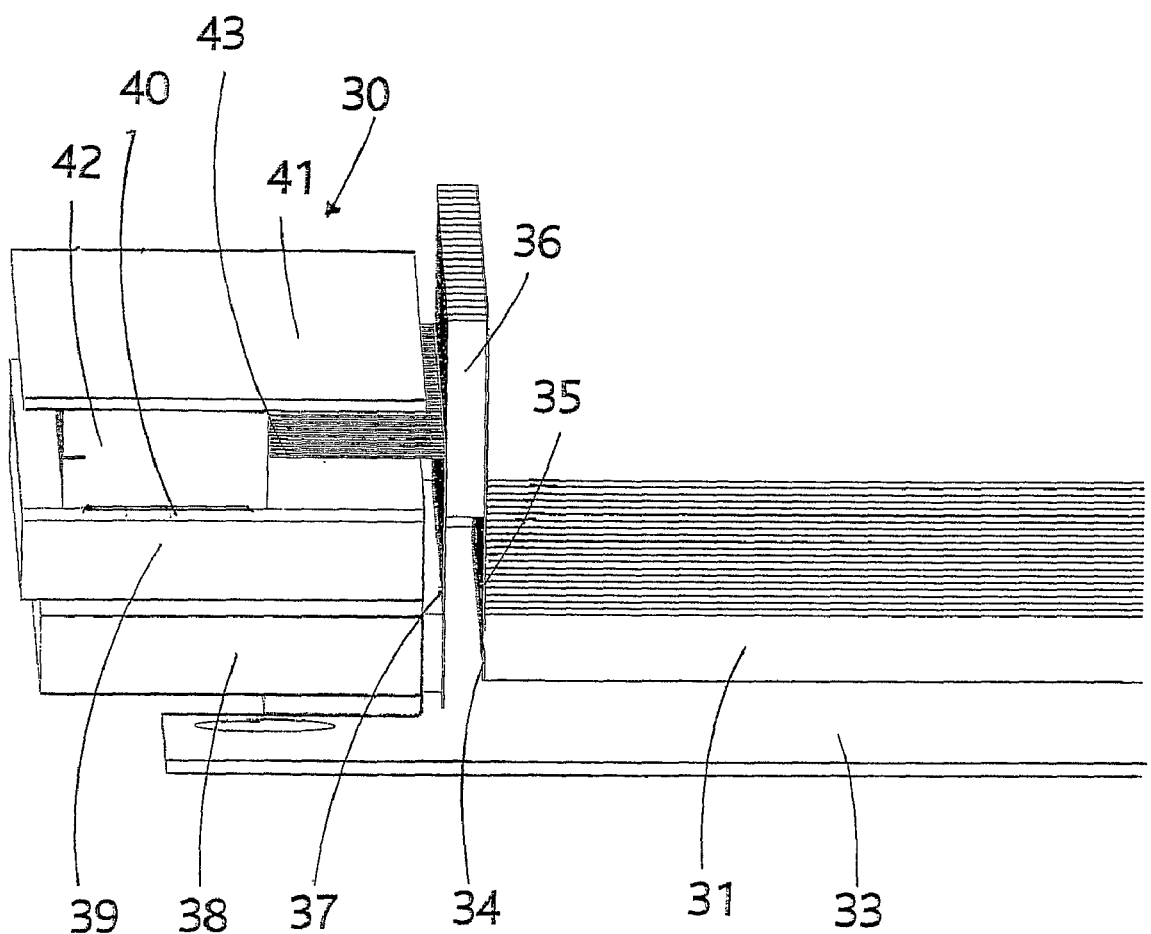
FIG. 6b shows a perspective side view of the rear portion of the actuator of FIG. 6b.

FIGS. 6a and 6b show separate views of an actuator 30 comprising a number of two dimensional monolithic piezoelectric actuators 31 of the kind described in detail in the applicant's own previous publication referenced above. These are supported by a block 32 onto a printed circuit board 33 which may be adapted to drive and sense the position of beams 31. The extremity 34 of beam 31 is attached to a flexure or connecting means 35 which joins extremity 34 to reflective element or mirror 36. A second connecting means or flexure 37 attaches mirror 36 to spacer block 38 which extends across the entire array of beams 31. Stacked onto spacer block 38, spacer block 39 supports a lower printed circuit board extending across the array of beams 31 which, together with printed circuit board 41 and vertical plates 42, form a capacitive sensing array which detects changes in capacitance when rods 43, which are attached to the rear of mirrors 36, are displaced inside the housing formed by two vertical plates 42 and portions of the printed circuit boards 40 and 41. Spacer block 38 extends beyond spacer block 39 in order to form a step 44 as shown in FIG. 6b which allows sufficient space for flexing of flexure 37 to take place.

In this configuration, when beam 31 displaces in the X direction, it will cause mirror 36 to tilt in the X/Y plane and when beam 31 displaces in the Y direction, it will cause the mirror to tilt in the Y/Z plane.

Figure 8A:
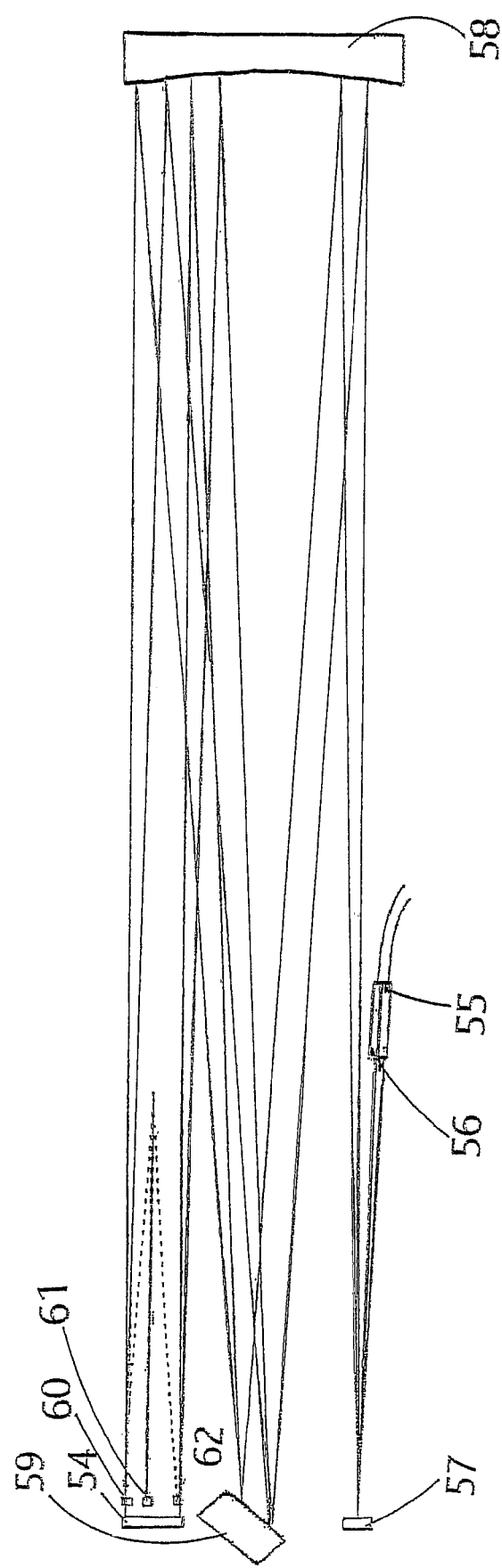
FIG. 8a shows a plan view of a frequency selective switch using actuated prisms.
Figure 8B:
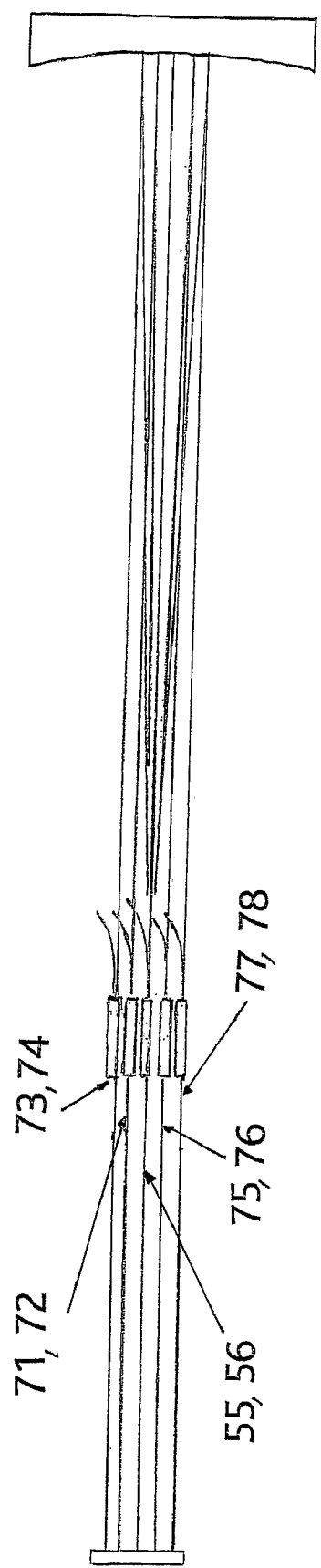

FIG. 7c shows an implementation of an actuator 44 placed in part of an add-drop switch. The actuator comprises a 2D piezoelectric beam 45 attached to a support structure 46 through a rear spacer 47. At extremity 48 of beam 45, a flexure 49 is provided which extends perpendicularly from beam 45. It connects to a linkage arm 50 which holds at its extremity 51 a prism 52. A second flexure 53 attaches linkage arm 50 to support structure 46. Since the distance between the flexures 49 and 53 is only approximately ⅙ of the length of linkage arm 50, any displacement of beam 45 will result in amplified displacement at extremity 51. Consequently, prism 52 may be displaced over a relatively large distance with minimal beam deflections. In this configuration, prism 52 may be displaced in front of a reflecting element 1 in this embodiment a mirror 1. FIG. 7a shows a beam of light reflecting off mirror 1 without prism 52 affecting the light beam. In FIG. 7b actuator 44 displaces prism 52 into the light beam which translates the light beam periscope faction. A key advantage of using the prisms to displace the light is that any tilt, twist or small displacement up/down or in/out has no first order effect on the shifted beam. This reduces the demand on the actuation structure which can be optimised for cost and ruggedness. One application of the actuator of FIG. 7 is in the spectrometer arrangement shown in FIG. 8a and FIG. 8b.

A number of input and output collimators, such as those referenced 55 and 56 respectively, are used as ports of the spectrometer. These are focused towards a point on a collimator mirror 57 which reflects back beams onto an imaging mirror 58 located at the focal length from grating 59. Grating 59 is located at 45° from the longitudinal axis of the spectrometer. The grating separates light into its constituents once again onto imaging mirror 58 which reflects in turn light towards frequency plane reflecting element 54. A number of prisms 60, 61 and 62 are provided in front of mirror 54 to switch the light from the in/out ports to a pair of add/drop ports. The light is shifted up or down by one collimator pitch to couple with a different pair of collimators, for example, add 1/drop 1 (71, 72), add 2/drop 2 (73, 74), add 3/drop 3 (75, 76) or add 4/drop 4 (77, 78) stacked vertically above and below 55 and 56.

Figure 9A:
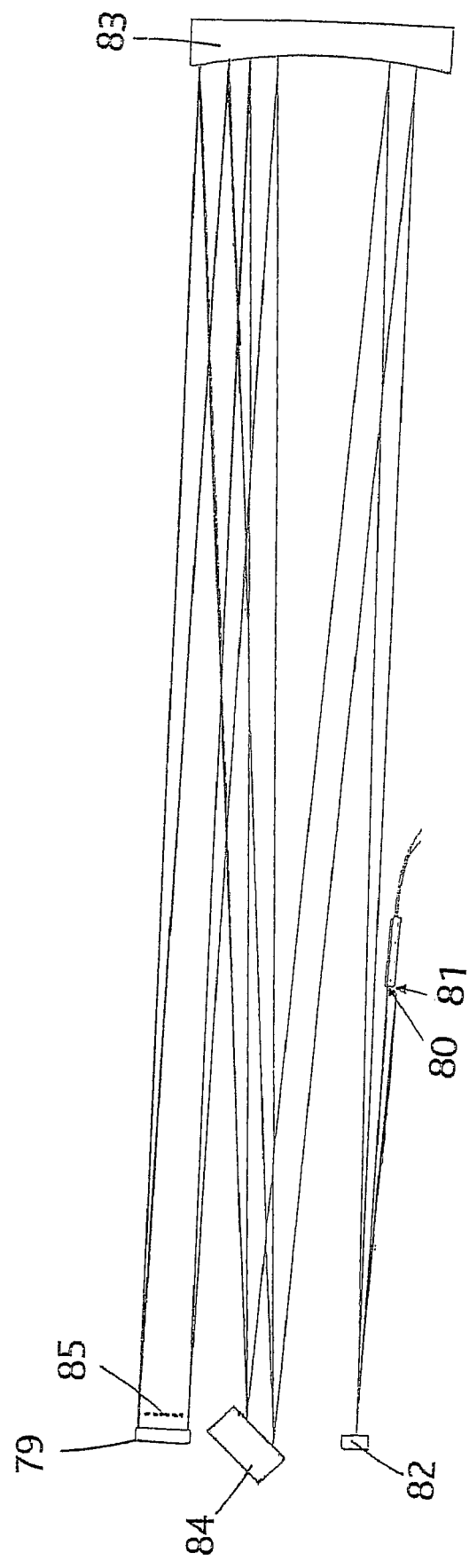
FIG. 9a shows a plan view of an optical frequency selective blocker switch.
Figure 9B:
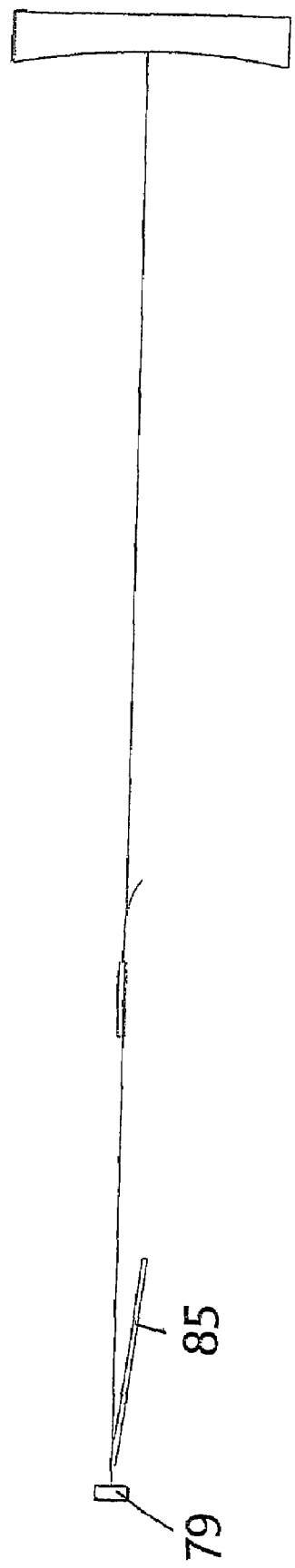

Instead of using two dimensional displacement actuators for each prism, the actuator may take the form of a one dimensional actuator array of the kind shown in FIGS. 1 to 5. It may also take the form of an actuator array without any optical element to be inserted into the beams at each wavelength by a variable amount. This would achieve a simple blocker architecture with one input and one output and variable attenuation for each wavelength. In this version, the reflective element 54 may be replaced by a simple plane mirror 59. Such an arrangement is shown in FIGS. 9a and 9b. In this configuration, there are two input/output ports 80, 81, a collimator mirror 82, an imaging mirror 83, a grating 84 and a one dimensional actuator array 85 which can displace into or out of the path of individual frequency light beams.

One possible implementation of these last two embodiments would use a 900 line per millimetre grating angled at 45° to incoming beams with overall dimensions of 8×12 mm. It is envisaged to use 1 mm diameter collimators operating at a working distance of 100 mm. It is also envisaged to use a band spacing of 500 GHz, 8 bands across C band, centred at 1,550 nm. The distance between the grating 59, mirror 54 and the focusing lens or imaging mirror 58 may be 200 mm, 200 mm focal length. It is envisaged to have the pitch of the frequency bands on the mirror 54 at 1 mm with a total width of 8 mm. It is also envisaged to have a beam waist of collimators of approximately 350 um diameter with an identical spot size on the imaging mirror. The angle of separation between in and out collimator beams is envisaged to be 15 mrad, whilst the separation between collimator centre lines would be 1.5 mm.

Figure 10:
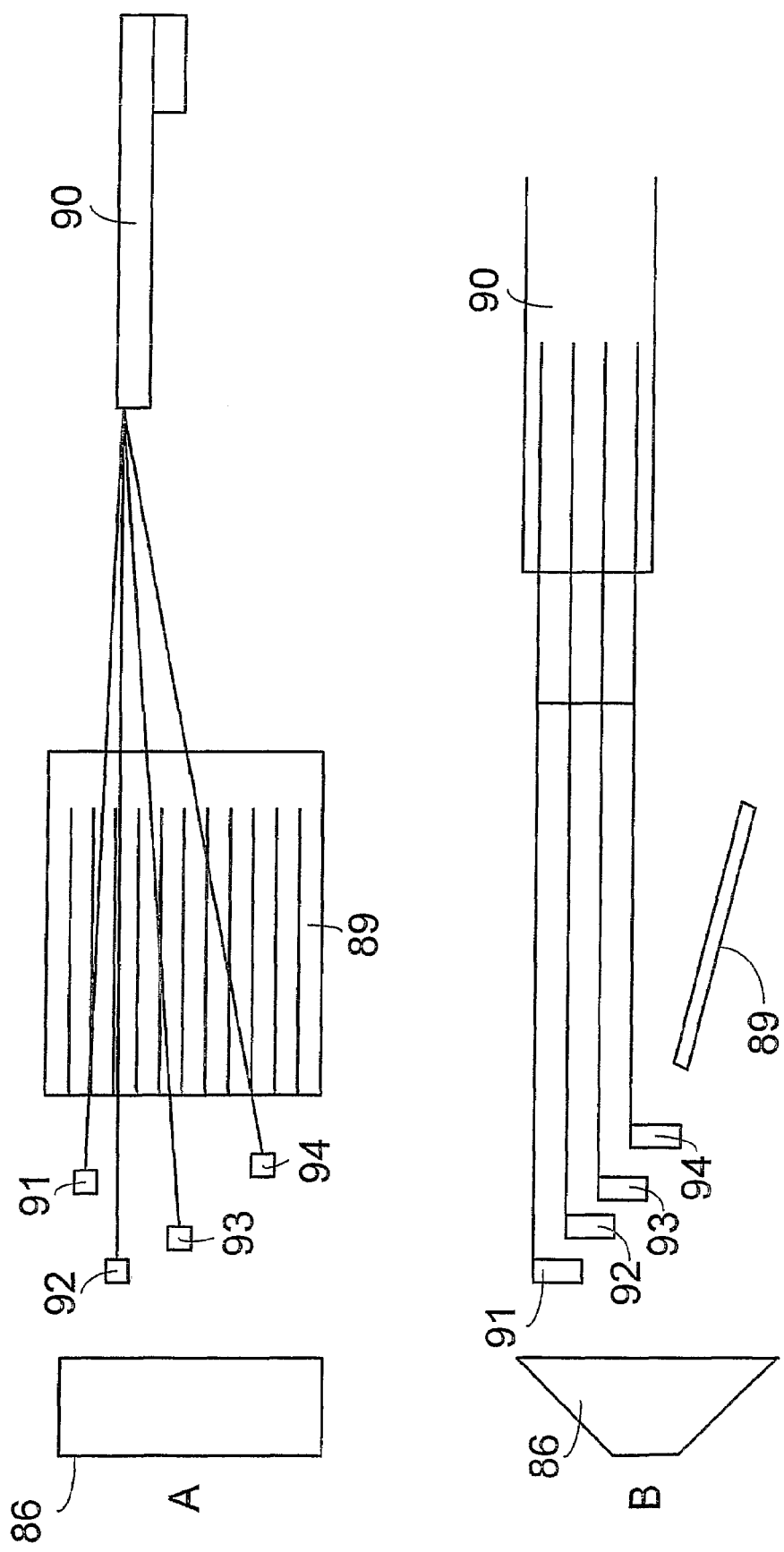
FIGS. 10a and 10b show respectively a top and side view of an optical frequency selective switch portion using prisms and a piezoelectric comb as a blocker.

It is also envisaged to use a piezo-actuator comb whose fingers are 20 mm long, 1 mm pitch and with a 0.1 mm slot between fingers. Each finger is made of two layers of soft piezoelectric ceramic, each of 0.5 mm thick. This is driven in parallel mode with a drive voltage swing of 300V, giving a deflection of 0.7 mm at the end of the piezoelectric actuator. The ends of the piezoelectric actuators are within preferably 1 mm of the mirror mounted at an angle of 15° to the horizontal. When in motion, the end of the piezo-actuators move from 0.25 mm (zero attenuation state) below beam centre to 0.45 mm above (fully blocked state). The invention also envisages the addition of a quarter wave plate to the front face of the mirror with its axis lined at 45° to the horizontal. This allows the axis of polarisation to rotate by 90° between the two passages over the attenuating fingers because the light passes through the wave plate twice. This allows the first order polarisation dependent loss created by fingers in the semi-blocked state to be cancelled whilst also cancelling the first order polarisation-dependent loss (PDL) introduced by the grating. The functions shown respectively in FIGS. 7 to 8b and 9a and 9b (flexible add drop and variable attenuation) can be combined in the same unit as shown in FIGS. 10a and b by making all the prism displacements in the same direction and placing the attenuating fingers in front. In this figure there is provided a frequency plane reflective element 86, a blocker ray 89, a prism actuator 90 and prisms 91, 92, 93 and 94.

Figure 11:
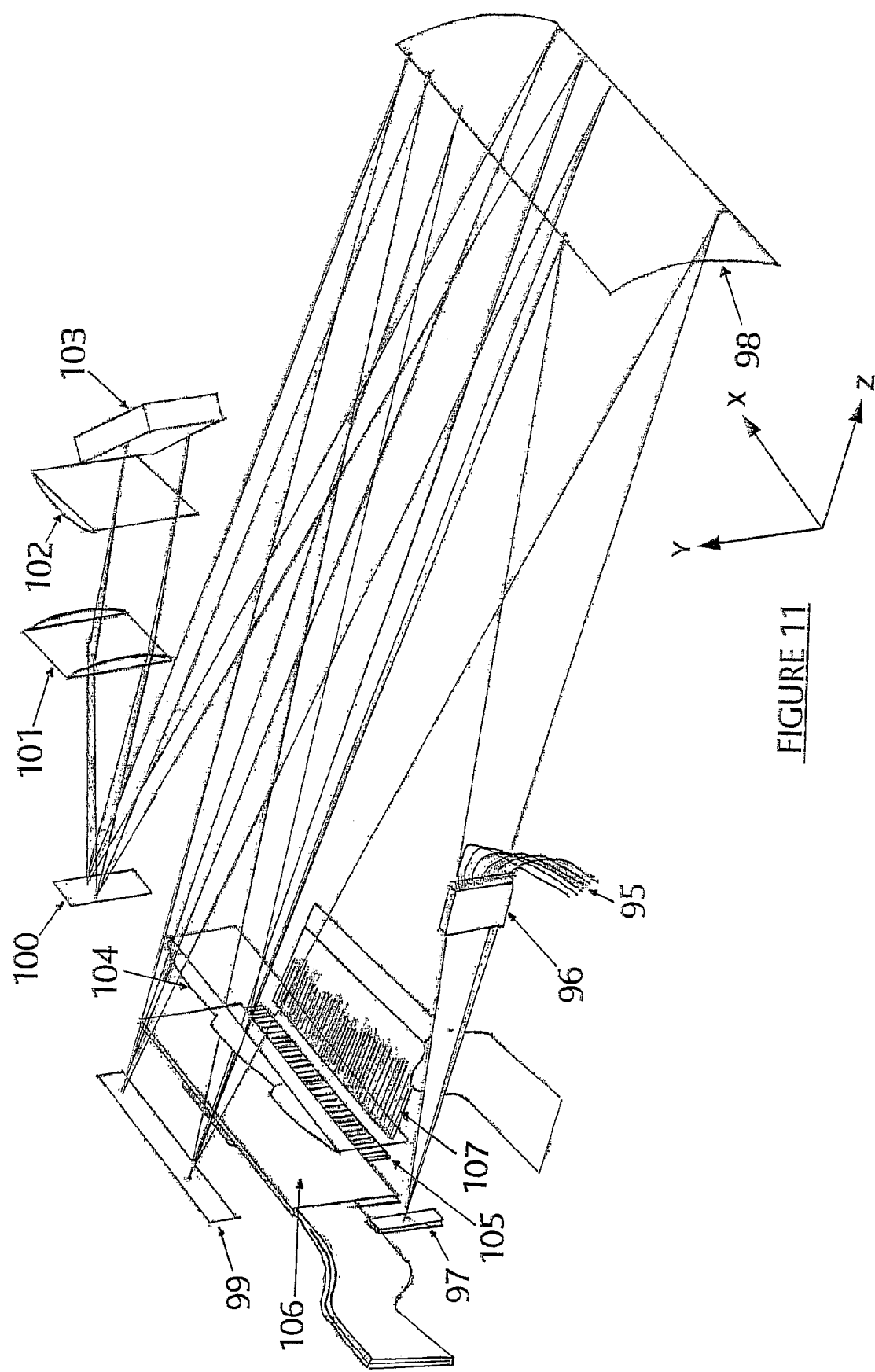
FIG. 11 shows a frequency selective switch in accordance with a further embodiment of the invention.
Figure 12:
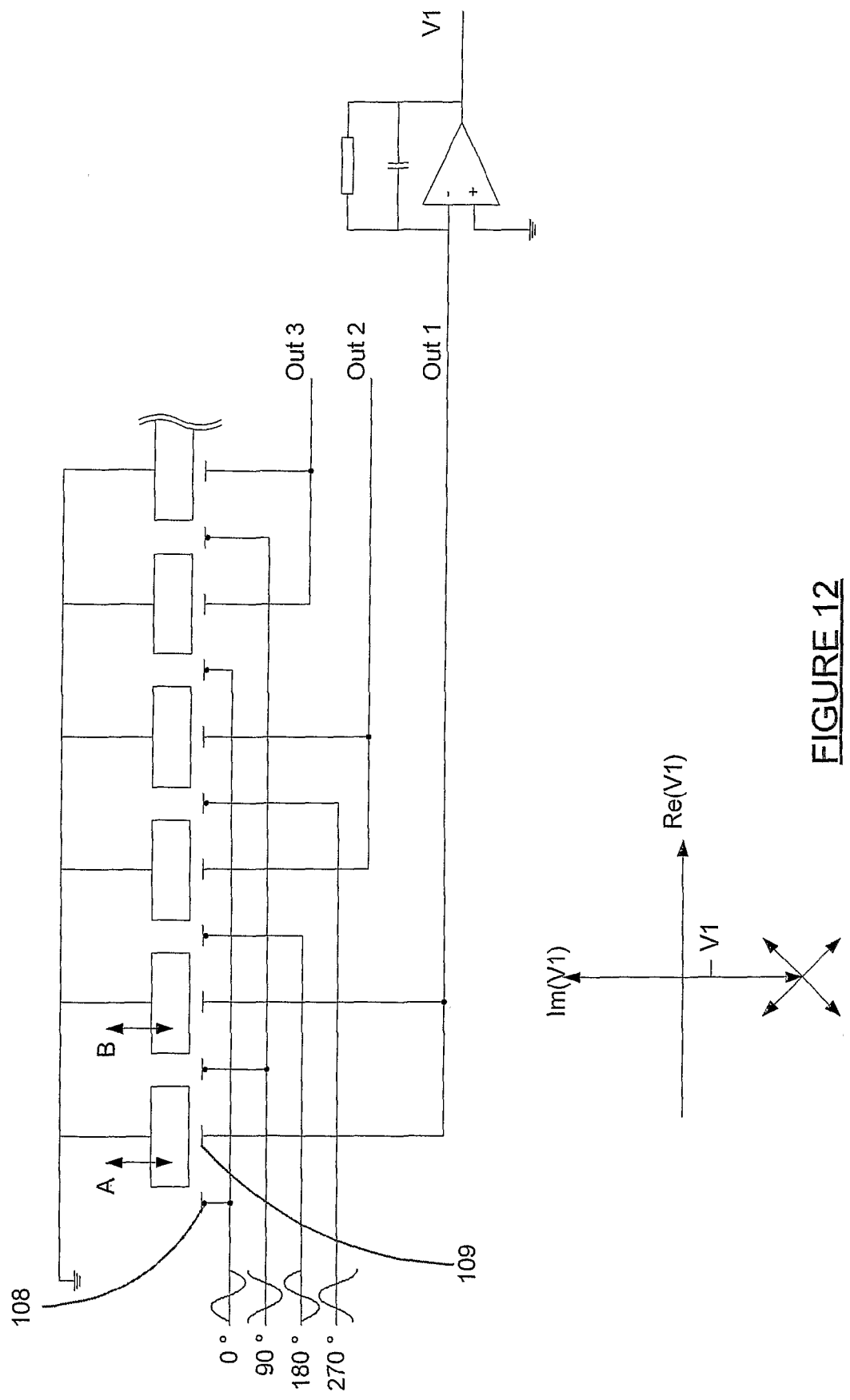
FIG. 12 shows a position sensing arrangement around the fingers of an actuator comb; the fingers in the figure being shown in cross-section.

FIG. 11 shows a three dimensional view of a wavelength selective switch using some of the actuators described in the previous embodiments. A number of optical fibres 95 couple light to a convergent linear n-way collimator array 96 designed so that beams from all lenses converge on a single point in the plane of the array. Each lens is also focused so that each beam goes through a Gaussian beam waist at the same point. The array is set up so that one port, for example, the input port is on a different pitch from the other n-1 ports (output ports). For example, 9 output ports on a 1 mm pitch with 1/10 input port offset by 1.5 mm so that the input port is out of step with the other 9. This prevents spurious coupling between the output ports when the input port is connected to the third/fifth/seventh etc. output port.

The beams from the collimators converge on a first folding mirror 97 then onto a cylindrical mirror 98 which re-images beam waist from collimators in one axis (Y) onto the second fold mirror 99 whilst allowing beams to carry on spreading out in the other axis (X). The beam is then reflected off a second folding mirror 99 back onto the cylindrical mirror 98, which again reimages the beams down to a waist in y onto the $3^{rd}$ fold mirror 100. Subsequently, the beam is reflected off the third folding mirror 100 and then through the cylindrical lens 101, which sends 10 separate near parallel beams off towards the grating and spherical grating lens 102 which gives a parallel beam into the grating, and then provides the focussing needed in the X plane to bring the light to a sharp focus on the array 105. The beam is then directed onto a low polarisation-dependent loss, high-efficiency diffraction grating 103 which fans out light at different wavelengths into an angle-to position lens 104 which directs beams of different wavelengths in parallel directions towards a one dimensional array of switching mirrors 105. This array takes the form of piezoelectric actuator 16 presented in FIG. 4 above. Varying the electric drive to each finger of the actuator changes the angle of the mirror attached to the finger thus the routing of the light at the corresponding wavelength. A capacitive position sensor 106 provides electrical feedback from the position of each finger in the actuator. This comb also has a capacitive position sensor (not shown) to ensure linear, stable and hysterysis free behaviour.

Light reflecting off array 105 then retraces its path through the system, arriving at the collimator array 96 at a height set by the angle of each mirror element in the array 105. By this means, the individual wavelengths on the input are directed to outputs 1 through 9.

One dimensional piezoelectric comb 107, without any optical elements, is located in close proximity to actuator 105 and is configured so that when driven at an appropriate level each finger is raised up blocking light at a corresponding wavelength altogether. Alternatively, if the finger is not in the blocking position, it will allow light to hit the appropriate switching element 105. This allows light at the relevant wavelength from the input ports to be blocked whilst a switch mirror changes position, thus preventing unwanted dynamic cross-talk as the mirror swings past the intermediate ports between the old and new destination ports.

An array of the kind presented in FIG. 4 may incorporate beneath its fingers an insulating substrate 108 plated with an array of metal tracks 109 parallel to the comb fingers when the actuator fingers are not deflected. The electrical connections of the tracks apply AC stimulus wave forms having the same frequency but relative phases of 0°, 90°, 180° and 270° to alternate tracks. The remaining tracks are connected in pairs to a low-noise op-amp. The op-amp is configured so that its output is proportional to the sum of the capacitive couplings between the tracks connected to its input and the adjacent stimulus track. A low impedance (at the stimulus frequency) connection is made from the fingers of the piezo-comb to ground. As the fingers move up and down, the amount of coupling between the stimulus tracks and the op-amp input varies. This causes the op-amp output to vary in the fashion indicated in the graph. It can be seen that varying the positions of each of the two fingers associated with any one op-amp produces orthogonal variations in that op-amp's output, thus allowing the position of the two teeth to be independently determined.

Figure 13:
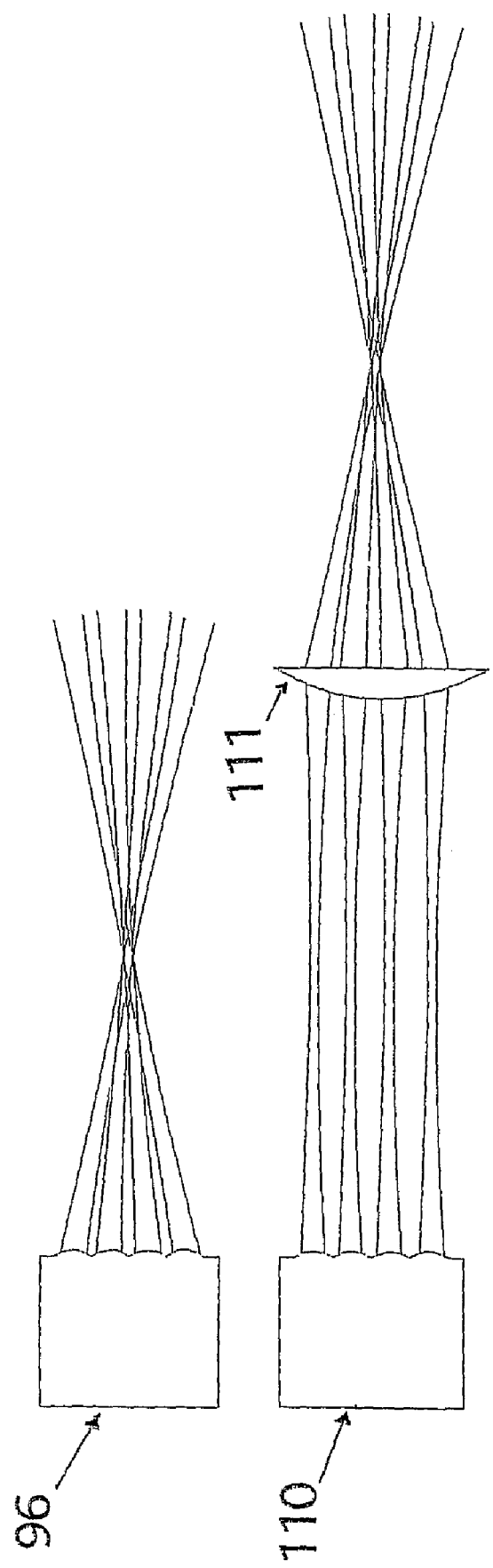
FIG. 13 shows the use of n-way-collimator arrays in both convergent mode and parallel mode.

As shown in FIG. 13, instead of using a convergent linear n-way collimator array 96, an array of non-convergent collimators 110 may be used to direct light onto an additional lens 111 placed in front of the array to cause the beams to converge to a point. By appropriate choice of the lens focal length and the separation of the lens and the collimator array, it is possible to ensure that all beams pass through a Gaussian beam waist at the same point as they all intersect. A comparison of a convergent collimator array 96 and a parallel collimator array is shown in FIG. 13.

The invention also envisages that to compensate for under/over focusing of light in the system, the positions of the Gaussian beam waists from the collimator array may be adjusted to be in front of or behind the point where all beams intersect.

The invention also envisages that, instead of being bonded directly to the comb, the flexures are used to attach the mirrors to the comb. An example of this can be seen in FIG. 14a. A piezoelectric ceramic beam 112 is secured at one extremity to a support structure 113 through a spacer 114. Beam 112 incorporates a flexure 115 extending perpendicularly from the free extremity of beam 112 and attaches a glass block 116. A second flexure 117 is used at the forward most face of block 116 to secure block 116 to the support structure 113. The assembly may be made as described above, with a single piezo-ceramic being bonded to two single flexures as one single block before the whole assembly is sawn into a number of fingers. Alternatively, the rear flexure 115 may be preformed with a number of discreet tabs for attaching to each tooth of a pre-made piezoelectric comb. The mirror and flexures can then be bonded and sawn before attachment to the piezoelectric comb. In all cases, the flexures are set up so that movement of the piezoelectric comb's fingers in one axis (for example up/down) is transmitted to the mirror whilst stray movements in other axes (for example in/out of the page are not coupled). The glass block may be mirrored to reflect light perpendicular to the piezo fingers as shown in beam path 119 and parallel to them as shown by beam path 118. The block side corresponding to path 118 may be used in 1 dimensional block motion mode whereas the block side corresponding to path 119 may be used in 2 dimensional block motion mode as well as 1 dimensional block motion mode if practical to do so.

As mentioned above with reference to FIG. 11, the light coming from the diffraction grating is spread out by wavelength. However, the amount by which different wavelengths are separated is not perfectly uniform across a band of wavelengths. To compensate for this, the piezo/mirror assembly can be sawn on a non-uniform pitch. Alternatively, the piezoelectric comb may be sawn at a fixed pitch and a mirror assembly may be sawn at a non-uniform pitch. These are then attached to each other.

Figure 14:
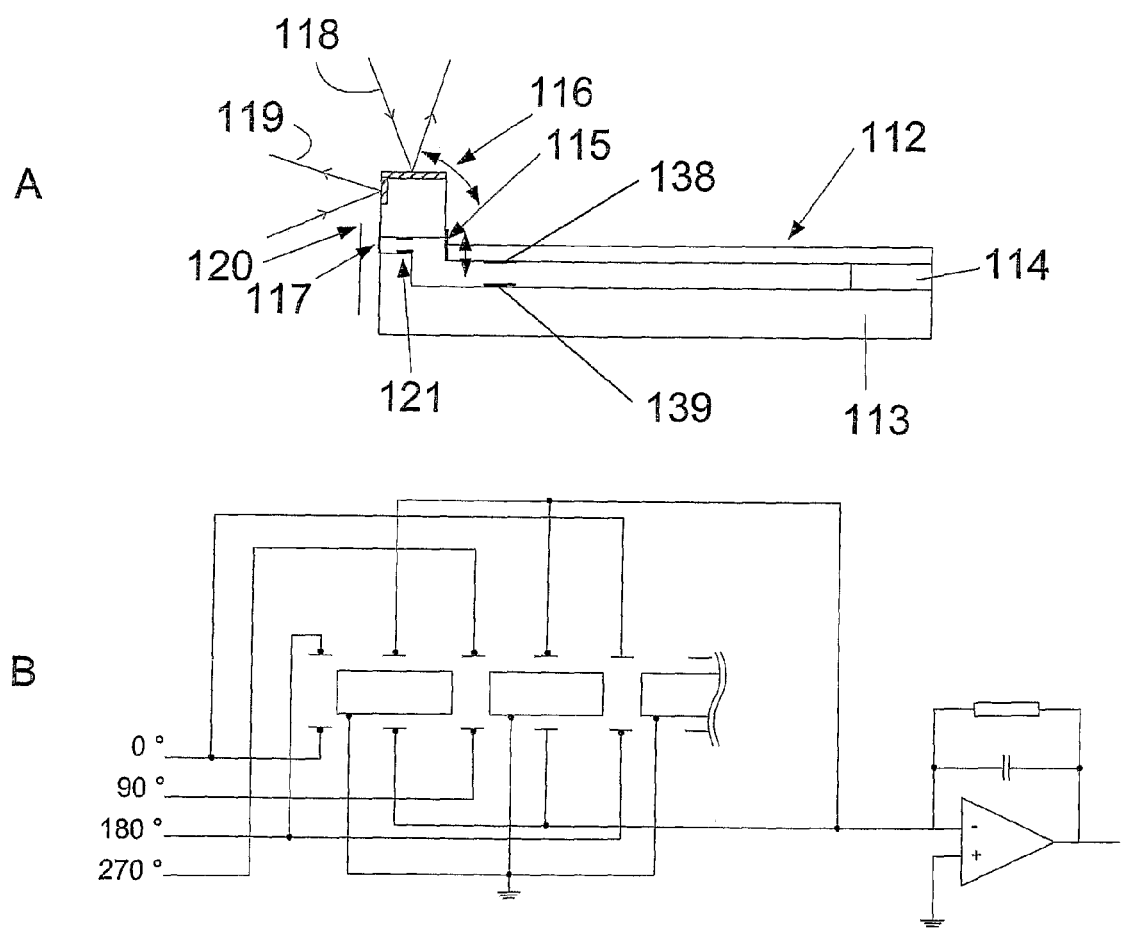

It is also possible to place an array of sensing tracks above the piezo comb fingers as well as below them. A differential sensor, as shown in FIG. 14b, can be implemented. The advantage of using such an arrangement is that it yields improved signal-to-noise performance over the original sensing scheme discussed above.

Returning to FIG. 14a, the invention also envisages the use of sensors at locations 120 and 121 in a forward spaced location from the front face of block 116 and in a spaced position beneath block 116 for sensor 121. Alternatively, sensors may be installed at both of these positions and use a differential scheme discussed above. A position sensing arrangement is also envisaged between board portions 139 and piezo-actuator portions 138.

Figure 15:
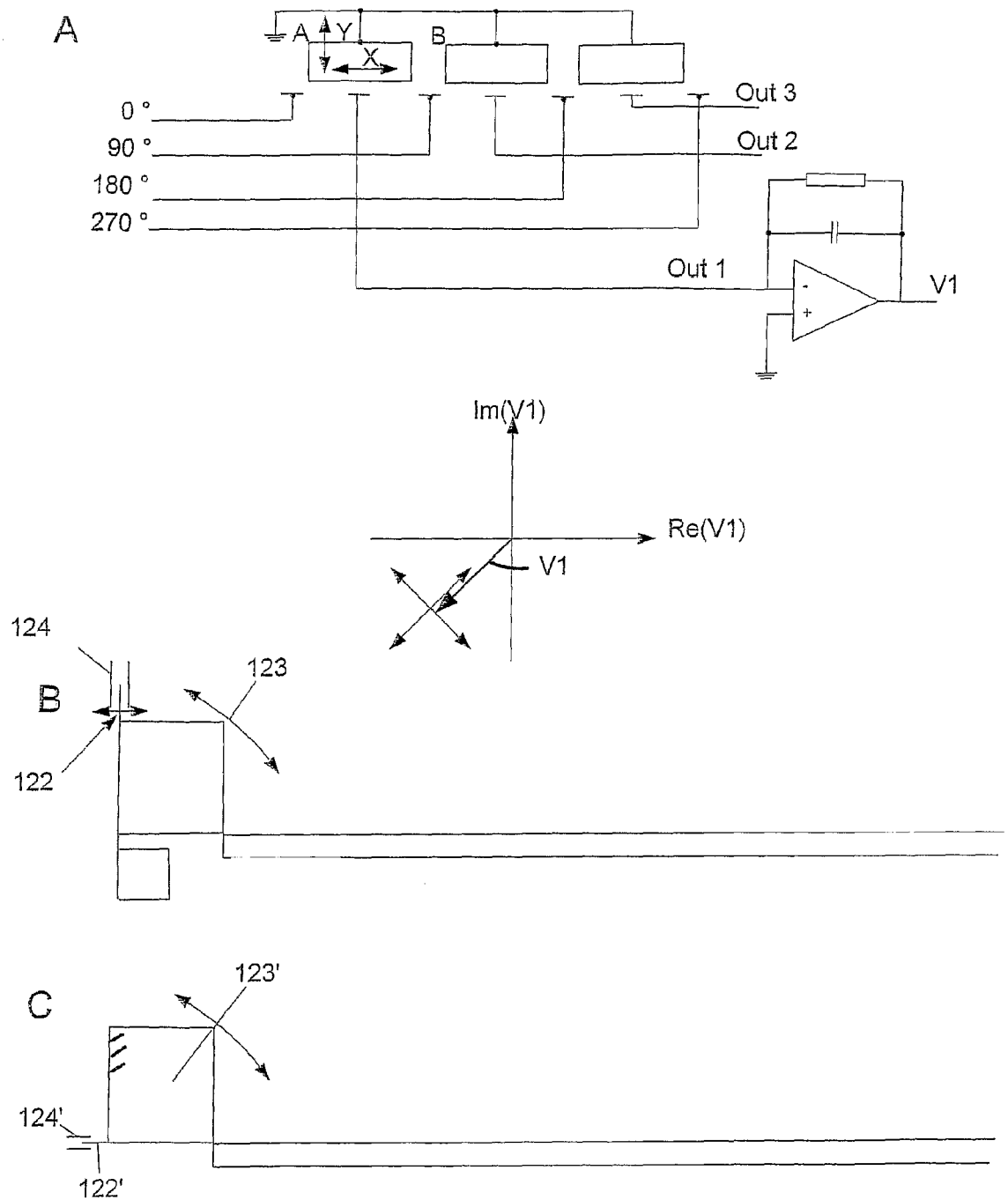
FIG. 15a shows the sensing arrangement for a 2 dimensionally displaceable finger array.
FIG. 15b shows a side view of a further sensing arrangement for sensing the position of a block.

Further alternatively, as shown in FIG. 15b, it may be possible to extend one of the flexures 122 beyond the glass block 123 and to use a differential sensor design 124 to sense the position of this flexure and thus infer the position of the glass block 123. The arrangement of FIG. 15b is particularly suited when employed with a 2 dimensional piezo-finger.

FIG. 15c shows a further embodiment where a flexure 122' extends forwardly from the glass block 123' into a differential position sensor 124'. This design is particularly suited when employed with a 1 dimensional piezo-finger. These may be used instead of the sensing arrangement located beneath the fingers as shown in FIG. 14a and referenced 138 and 139.

Each piezoelectric finger may be made capable of moving in two dimensions: both up and down relative to the plane of the comb, and left and right within the comb. In this embodiment, it is possible to change which output port the input port is coupled to without steering the light from the input port across intermediate output ports in the process. The need for the blocker comb would then be avoided. FIG. 15a shows a position sensing scheme suitable for two axes movement monitoring.

FIGS. 16a and b show a further wavelength selective switch in accordance with a further embodiment of the invention. The switch comprises an input collimator 125 which may send a beam of light through a cylindrical lens 126 onto a spherical mirror 127. The light is then reflected onto a grating 128 and back onto spherical mirror 127. The light then passes through cylindrical lens 129 prior to tipping mirror array 130 which can be any of the embodiments described in this application. The light then retraces its path through the system to one of nine output collimators 125a ... 125i depending on the angle of the individual array mirror element 130. In this embodiment, the distances can be: a) approximately 1.5-10.5 mm; b) 115 mm; c) 65 mm; d) approximately 1-2 mm; e) 1.3 mm; f) 66 mm; g) approximately 1.5-10.5 mm and h) approximately 1000 mm. These distances are used as an example of appropriate distances without intending to be limiting.

Figure 17:
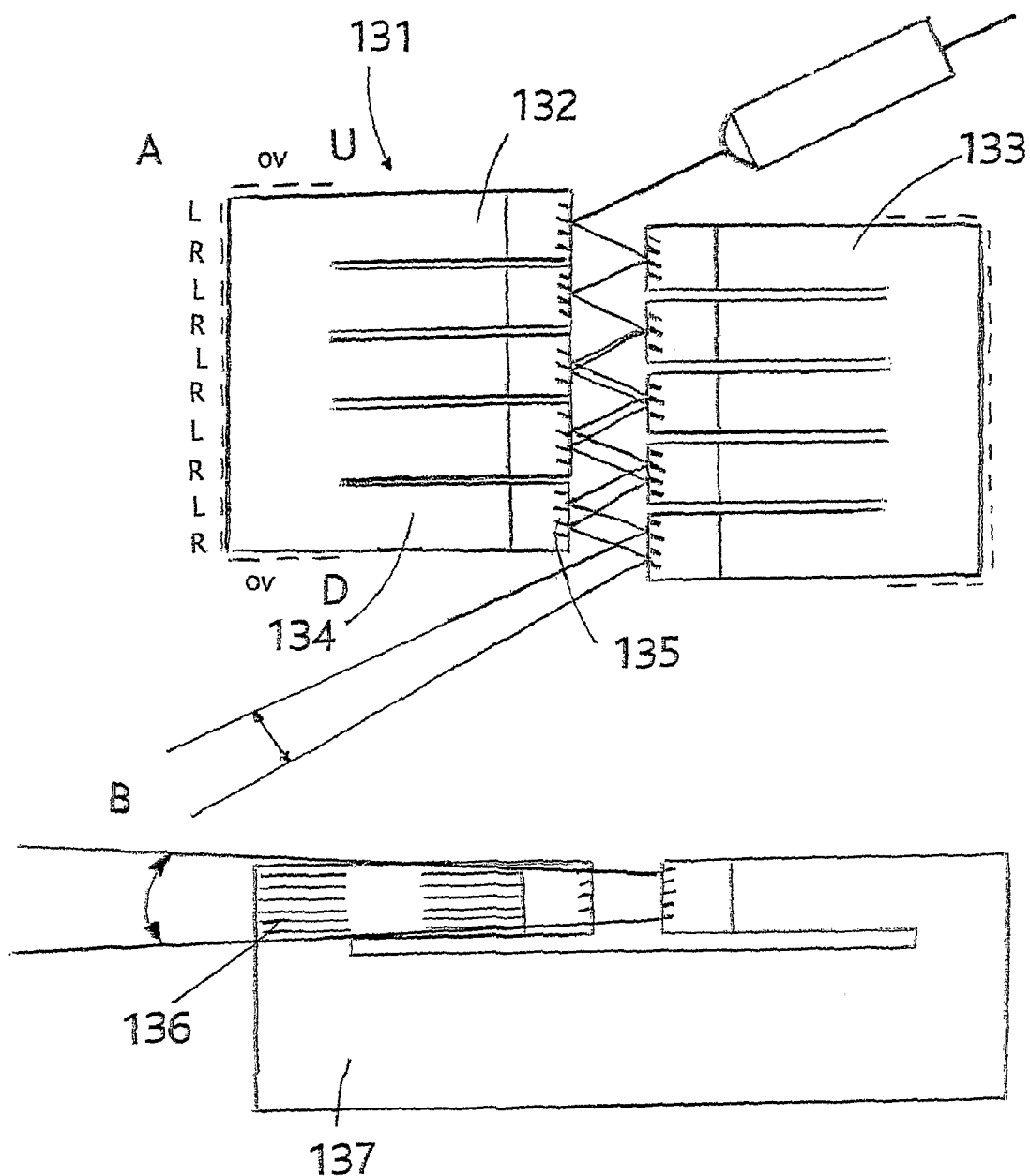
FIGS. 17a and 17b show an arrangement of two piezoelectric combs forming a scanner in a plan view and a side cross-sectional view respectively.
Figure 18:
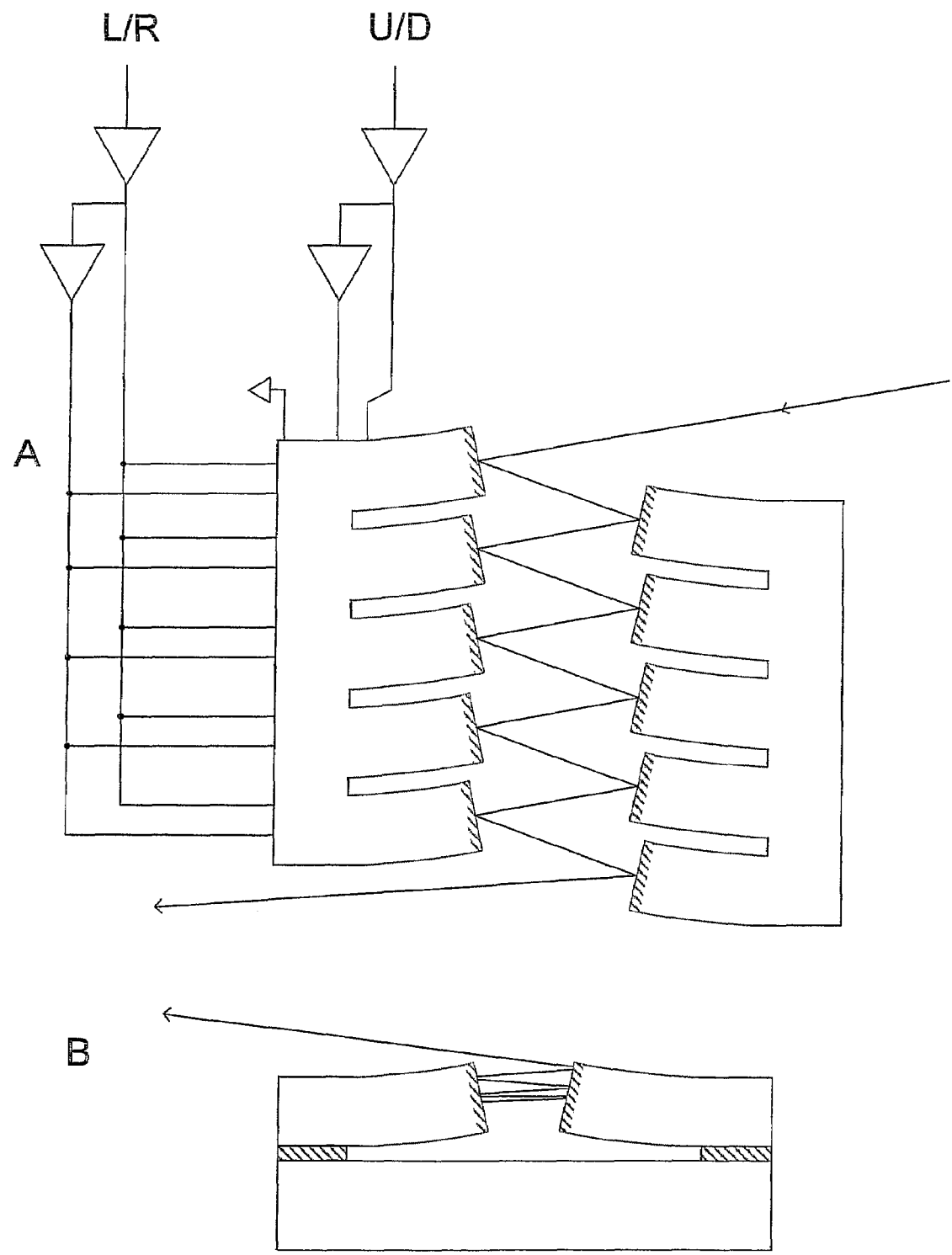
FIGS. 18a and 18b show the embodiment of FIG. 17 where the fingers of the piezoelectric comb actuator are flexed.

FIGS. 17a and b show a multiple piezoelectric laser scanner 131 comprising two oppositely placed actuators 132 and 133. Each actuator is in the form of a piezoelectric comb where each finger 134 terminates in a reflective element or mirror 135, the piezoelectric combs of these actuators are preferably constructed by initially attaching the mirrors 135 to a block of piezoelectric material prior to diamond sawing the slots to make the separate fingers of the comb. Each finger of the comb is driven by appropriate electric means to achieve two dimensional displacements of the mirrors. FIGS. 18a and b show the piezoelectric laser scanner with the fingers in a deflected mode as well as the electronic driving circuitry.

Figure 19:
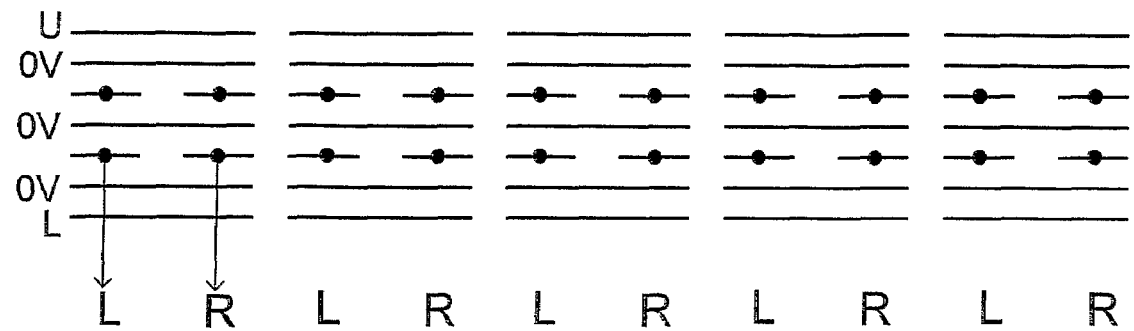
FIG. 19 shows a schematic representation of the electrode plates and piezoelectric layers in cross-sectional view of the five finger comb actuator of FIGS. 17 and 18.

FIG. 17b also shows the layers of conductors, such as that referenced 136, and the base plate 137 onto which the actuator arrays are mounted. FIG. 19 also shows the conductor layers within the actuator array interleaved with piezoelectric ceramic material necessary to achieve (U), down (D), left (L) and right (R) displacements of the individual fingers.

Using a pair of five finger actuator combs with a pitch of 1 mm; the fingers being 0.9 mm thick and of 3 mm long, a scanner can be made capable of 0.1 radian total scan angle in both axes having a bandwidth of approximately 15 kHz.

Figure 20:
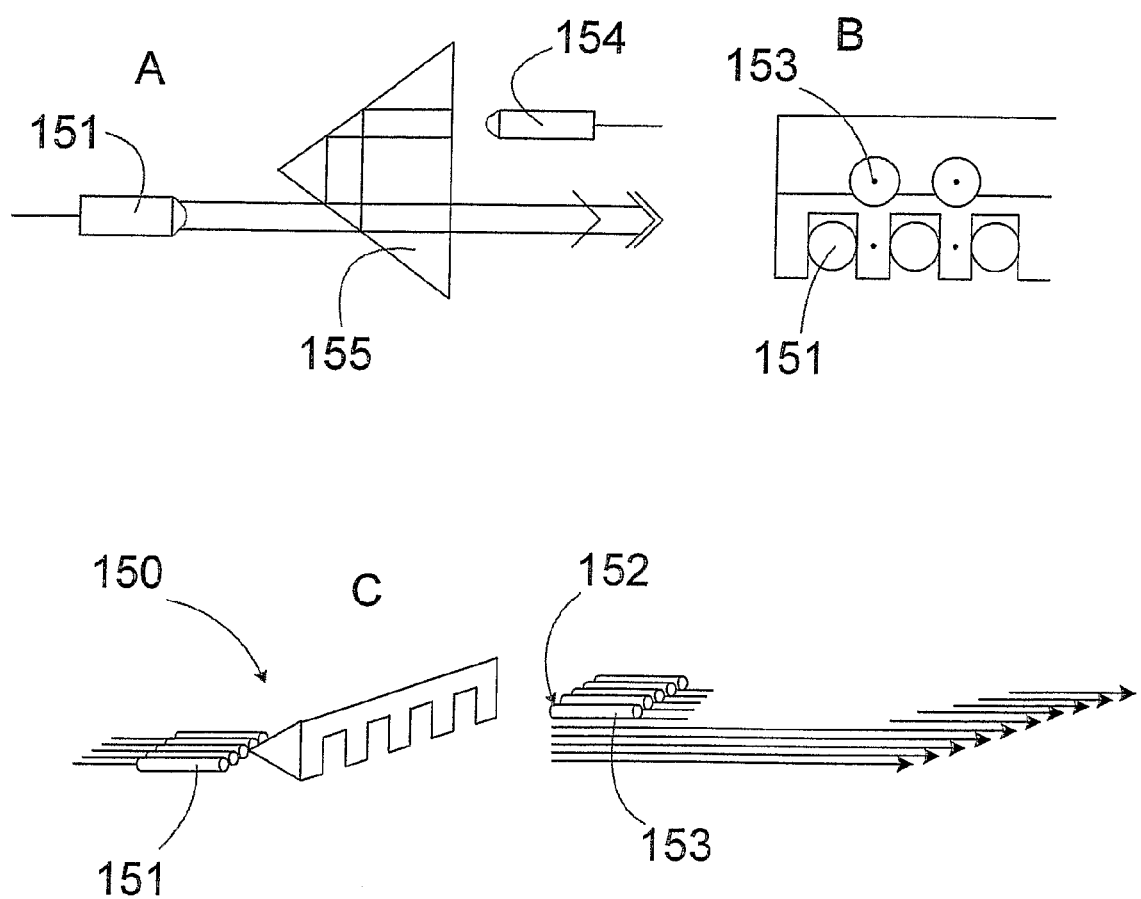
FIGS. 20a, b and c show an array of optical inputs associated with a slotted prism in schematic side view, side view and perspective view respectively.

FIG. 20C shows a bank 150 of optical elements as collimators 151 placed at a pitch of 2 mm in front of the slots of a slotted prism (a slotted right prism in this embodiment). A bank 152 of optical elements as collimators 153 are also provided placed at a pitch of 2 mm to direct light between the slots of the prism so that the light bounces of face 154 and 155. The resultant output beams' array of this arrangement results in a beam array at a pitch of only 1 mm. In other words, the output array has a pitch of half the pitch of the input collimators.

Figure 21:
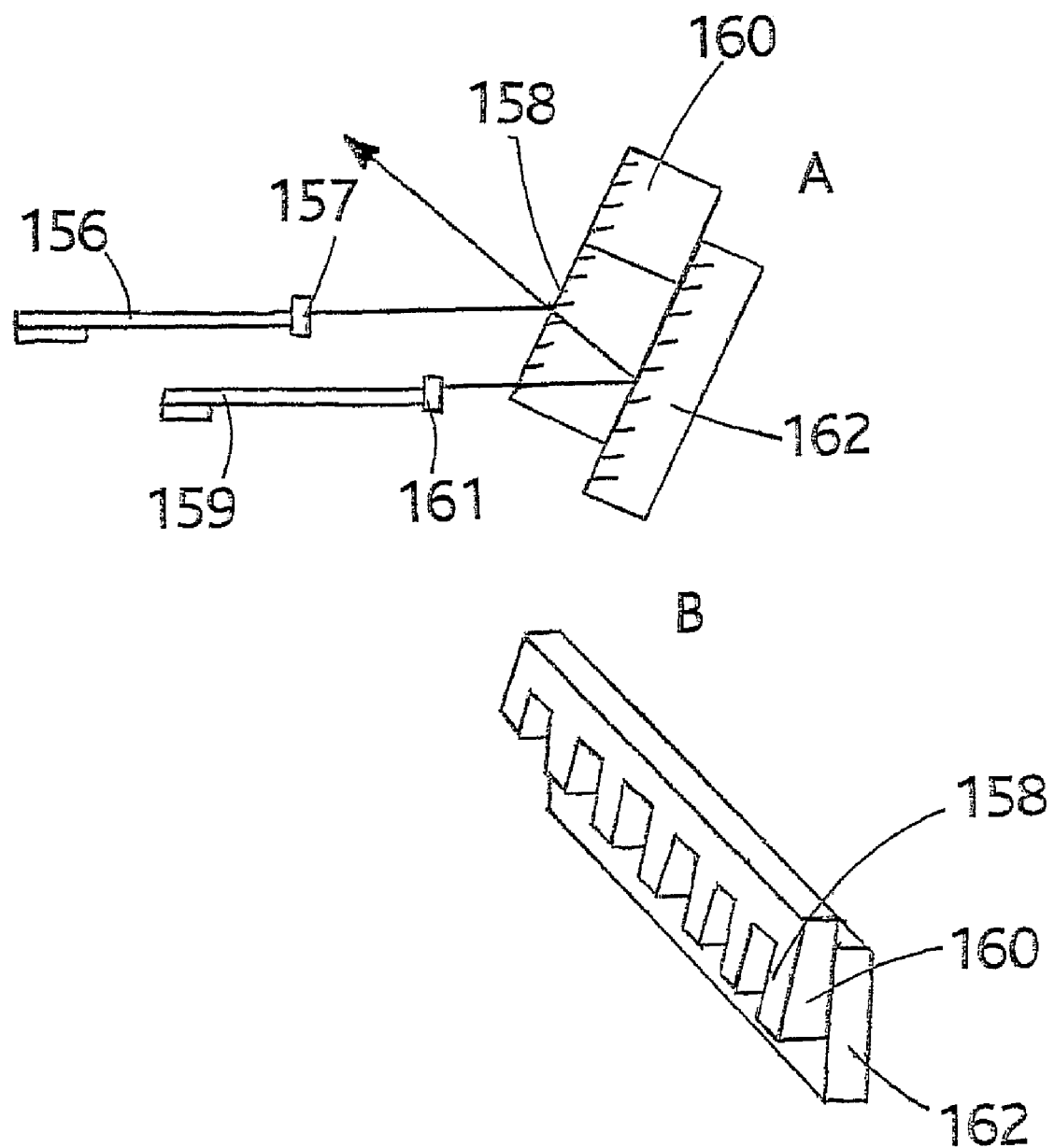
FIGS. 21a and b show an array of optical inputs associated with a slotted mirror in schematic side/cross-sectional view and the slotted optical elements in perspective view respectively.

FIG. 21 show an alternate interleaved arrangement where actuator 156 comprises a reflector 157 for directing light onto the finger 158 of a slotted mirror 160 whilst actuator 159 comprises a reflector 161 for directing light between the fingers of the slotted mirror or through a slot of the mirror in order to be reflected by rear mirror 162. The actuators are spaced at a pitch of 2 mm and achieve through this arrangement output beams at a pitch of 1 mm.

FIG. 22 show a further interleaved arrangement where actuator 163 uses a reflector 164 to direct light onto a slotted glass block 165 which directs light out through one of its fingers 166. This arrangement uses a second actuator 167 which directs light between the fingers through the slots 168 so that whilst the pitch of the actuators is 2 mm the pitch of the output beams is only 1 mm.

The interleaved embodiment above may be used with a variety of inputs such as collimators or reflectors or any other appropriate input as selected by the person skilled in the art from known alternatives.

FIG. 23 show a collimator 169 which is to be held in position by flexures such those referenced 170 and 171 which attach at the front and rear of the collimator respectively and extend upwards to be held by a clamping block 172. The block incorporates a number of clamps 173 to grip a flexure by adjusting the bolt 174. This arrangement may be employed to permit fine adjustment in manufacture of the x and y pointing angle and x and y position (i.e. 4 axes in total).

The invention claimed is:

1. An optical switch comprising
    at least one input port for directing an optical beam into the switch;
    a dispersive component configured to receive said optical beam and which spatially separates the optical beam into individual wavelength components which are routed to an actuator;
    wherein the actuator is in the form of an array of elongate movable fingers equipped with at least one switching element which directs individual wavelength components to selected output ports dependent upon the amount by which said switching elements are displaced by said fingers; and
    wherein said actuator is configured to selectively interfere with individual wavelength components to avoid selected wavelengths from being routed to output ports.

2. An optical switch according to claim 1, wherein at least one finger is part of a comb array.

3. An optical switch according to claim 1, wherein at least one finger displaces an optical element.

4. An optical switch according to claim 3, wherein the optical element is a reflective element which is displaceable in order to interfere with selected wavelength components.

5. An optical switch according to claim 4, wherein the optical element is a prism.

6. An optical switch according to claim 5, wherein the prism is truncated to form a surface for engaging the free moving extremity of the finger.

7. An optical switch according to claim 5, wherein the prism is attached by one of its edges to the free moving extremity of the finger.

8. An optical switch according to claim 4, wherein the reflective element is a mirror.

9. An optical switch according to claim 8, wherein the mirror is mounted along the axis of the corresponding finger.

10. An optical switch according to claim 8, wherein the mirror extends substantially perpendicularly from the longitudinal axis of the fingers.

11. An optical switch according to claim 1, comprising a plurality of fingers which form part of a comb; the fingers displace in one dimension; a first set of said comb carry optical elements; and a second set of fingers of said comb are linked to fingers of the first set by one or more linkage arms; whereby the first set of fingers drive the displacement of selected optical elements in a first dimension and the second set of fingers drive the displacement in a second dimension of selected optical element carrying fingers.

12. An optical switch according to claim 1, wherein the switch comprises a first array of actuator fingers without optical elements and a second array of actuator fingers with optical elements for directing wavelength components.

13. An optical switch according to claim 1, wherein the fingers incorporate a mirror located in front of the free movable extremity of the fingers.

14. An optical switch according to claim 1, wherein an electrical sensor is provided to sense the position of the fingers.

15. An optical switch according to claim 1, wherein the actuator is a single actuator.

16. An optical switch according to claim 1, wherein an actuator incorporates fingers which displace in two dimensions.

17. An optical switch according to claim 1, wherein the switch comprises a first array of actuator fingers adapted to selectively interfere with individual components to avoid selected wavelengths from being routed to selected output ports and a second array of actuator fingers with optical elements for directing wavelength components to selected output ports dependent upon the amount by which said elements are displaced by said fingers.

18. An optical switch comprising
at least one input port for directing an optical beam into the switch;
a dispersive component configured to receive said optical beam and which spatially separates the optical beam into individual wavelength components which are routed to an actuator;
wherein the actuator is in the form of an array of elongate movable fingers for selectively interfering with individual wavelength components and a switching component is provided to direct optical beams to selected at least one output port; and
wherein at least one finger of the elongate movable fingers is a piezoelectric bender which does not carry an optical element but are displaceable into individual wavelength components to block selected wavelengths.

19. An optical switch comprising
at least one input port for directing an optical beam into the switch;
a dispersive component configured to receive said optical beam and which spatially separates the optical beam into individual wavelength components which are routed to an actuator;
wherein the actuator is in the form of an array of elongate movable fingers for selectively interfering with individual wavelength components and a switching component is provided to direct optical beams to selected at least one output port; and
wherein at least one finger of the elongate movable fingers displaces an optical element; the optical element is a reflective element which is displaceable in order to interfere with selected wavelength components; and the reflective element is attached to the at least one finger by a flexure.

20. An optical switch comprising
at least one input port for directing an optical beam into the switch;
a dispersive component configured to receive said optical beam and which spatially separates the optical beam into individual wavelength components which are routed to an actuator;
wherein the actuator is in the form of an array of elongate movable fingers for selectively interfering with individual wavelength components and a switching component is provided to direct optical beams to selected at least one output port; and
wherein the fingers are monolithic piezoelectric actuators displaceable in two dimensions, with a first connector to an optical element and a second connector between the optical element and a support structure; whereby the first connector and the second connector are spaced to achieve amplified movement of the optical element.

21. An optical switch according to claim 20, wherein an electrical sensor is provided to sense the position of the connector.

22. An optical switch comprising
at least one input port for directing an optical beam into the switch;
a dispersive component configured to receive said optical beam and which spatially separates the optical beam into individual wavelength components which are routed to an actuator;
wherein the actuator is in the form of an array of elongate movable fingers for selectively interfering with individual wavelength components and a switching component is provided to direct optical beams to selected at least one output port; and
wherein the fingers displace an optical element with a rod extending from the element into a housing equipped with a sensor for sensing the position of the rod within said housing.

* * * * *